Dec. 8, 1936.  C. T. RAY  2,063,851
TILLAGE IMPLEMENT
Filed July 15, 1932  13 Sheets-Sheet 2

Inventor
Charles T. Ray.
By C. J. Stockman
Attorney

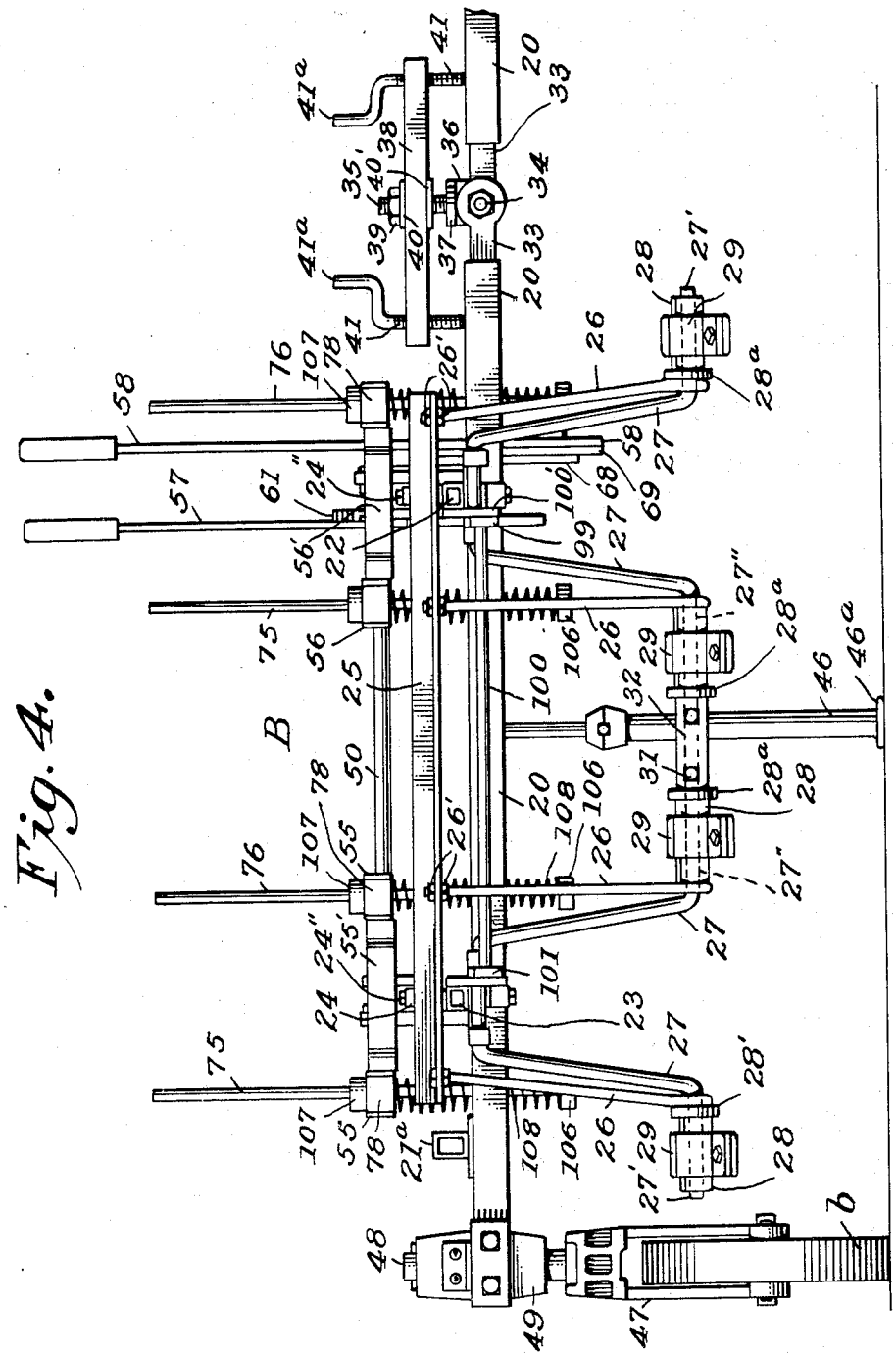

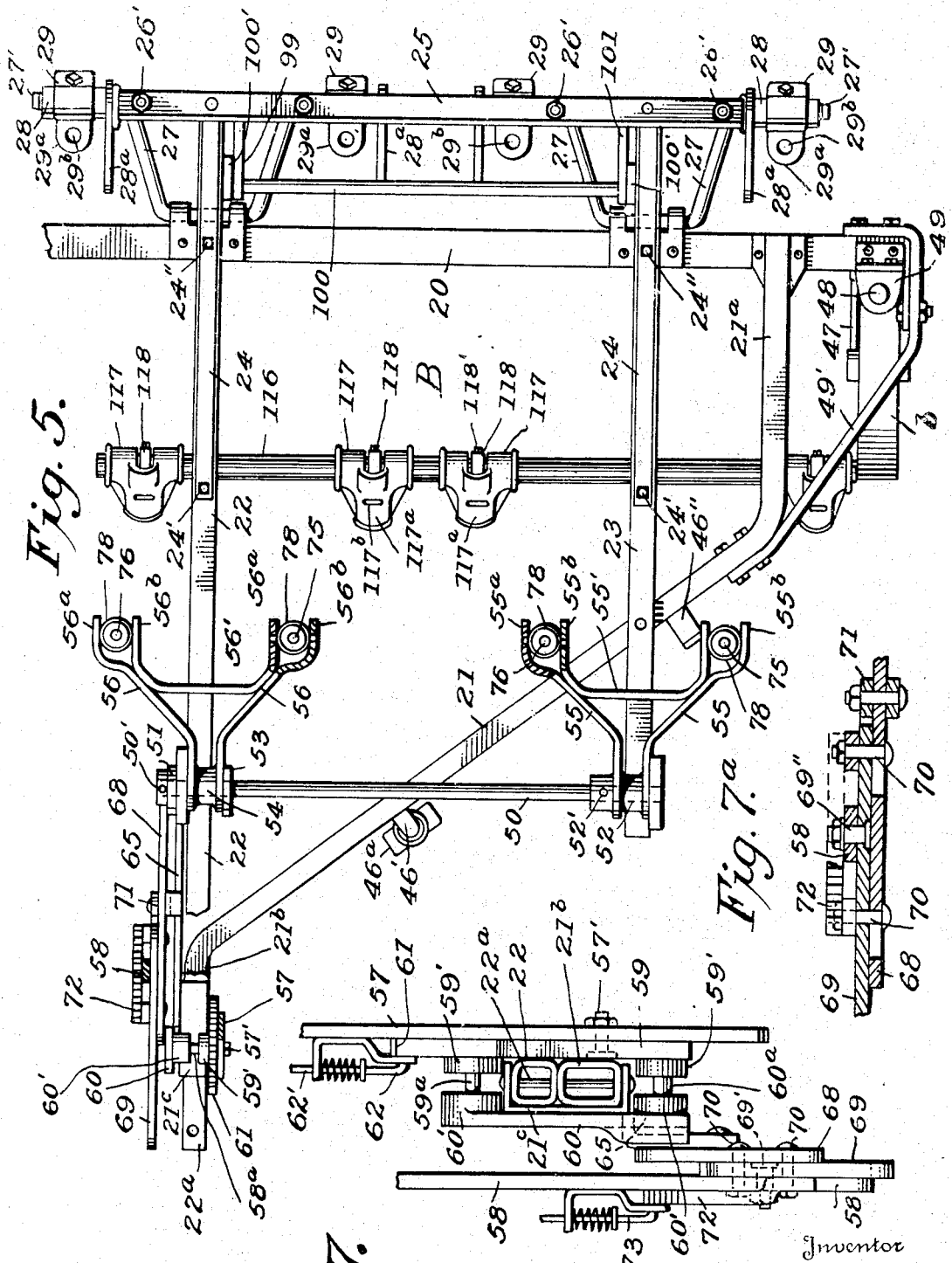

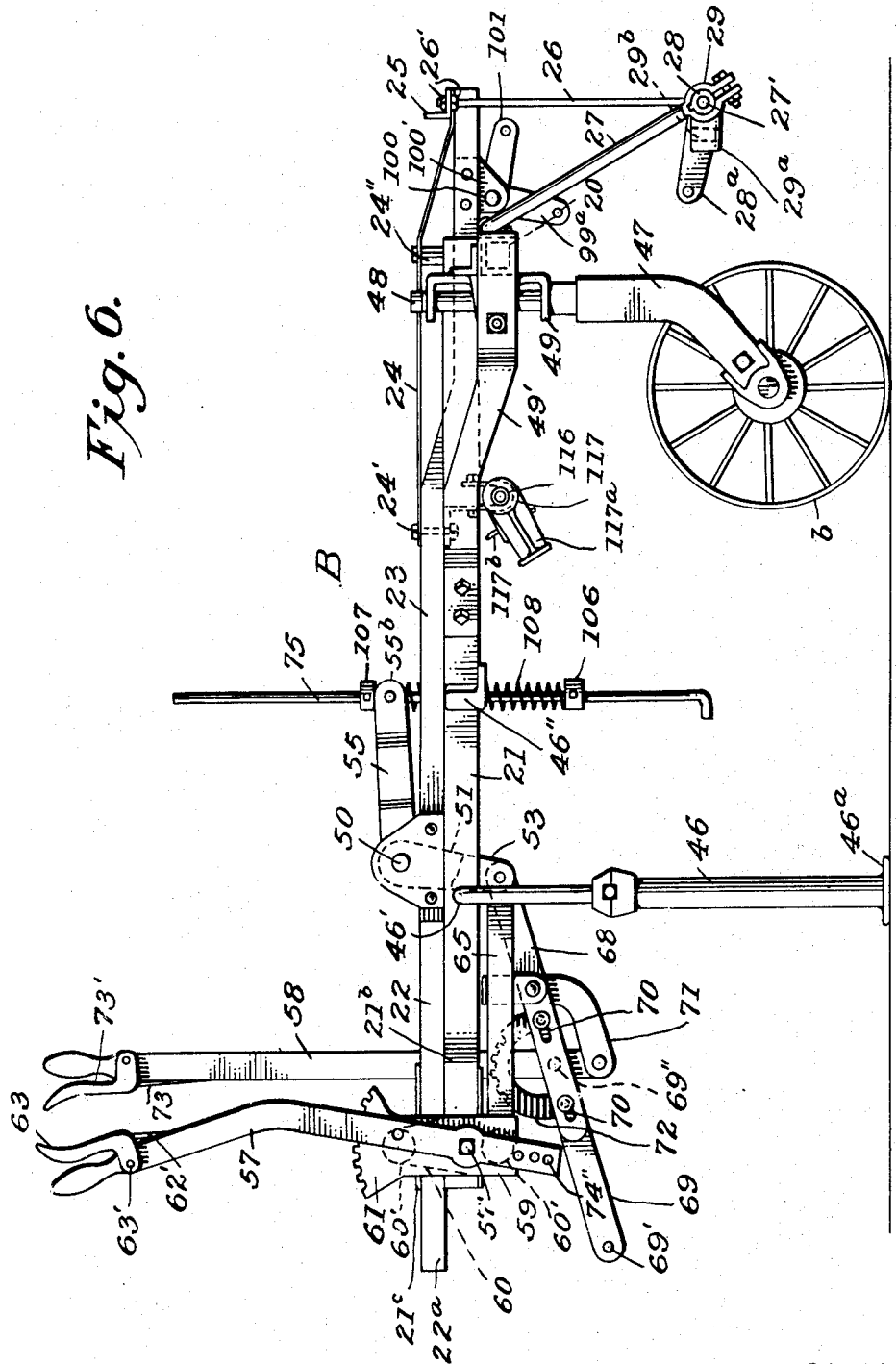

Dec. 8, 1936. C. T. RAY 2,063,851
TILLAGE IMPLEMENT
Filed July 15, 1932 13 Sheets-Sheet 6
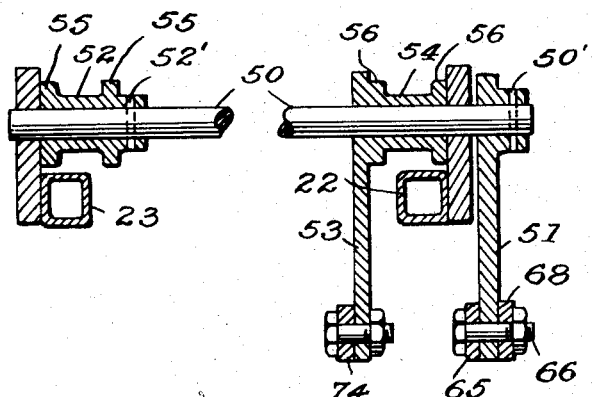
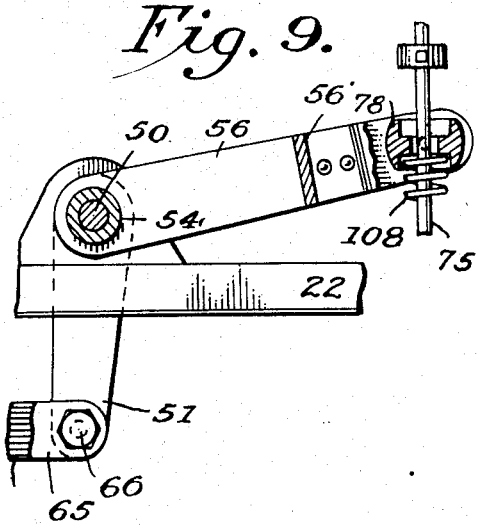
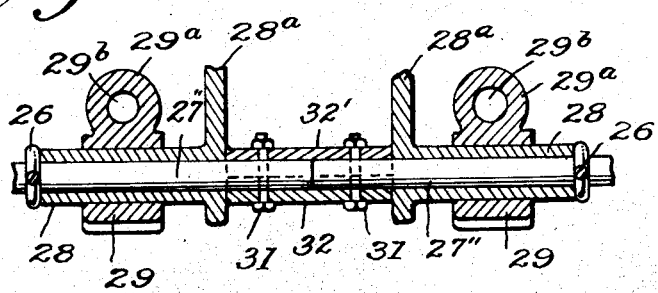
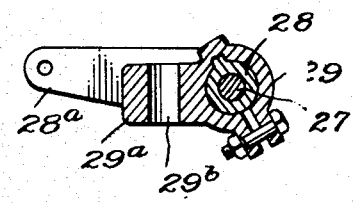
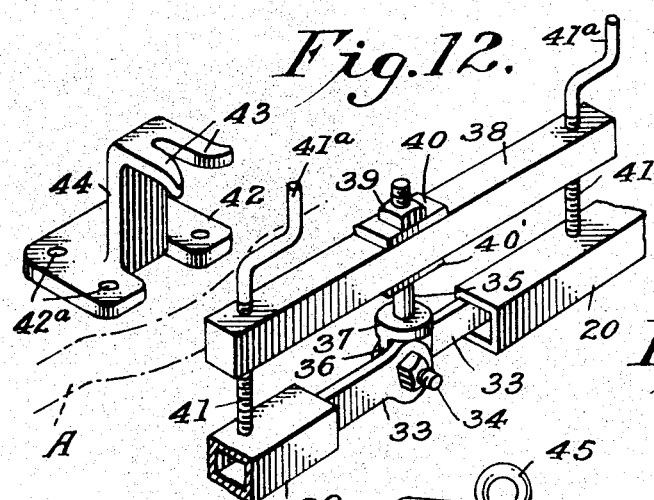
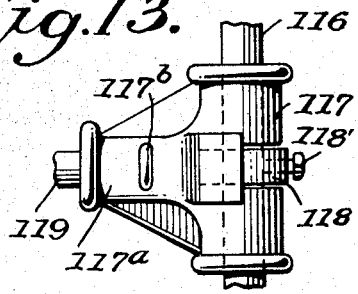
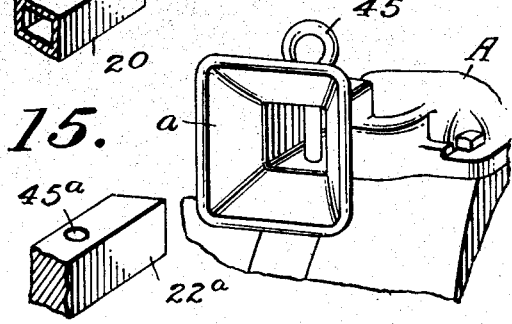
Inventor
Charles T. Ray.
C. J. Stockman
Attorney Dec. 8, 1936.  C. T. RAY  2,063,851
TILLAGE IMPLEMENT
Filed July 15, 1932  13 Sheets-Sheet 7
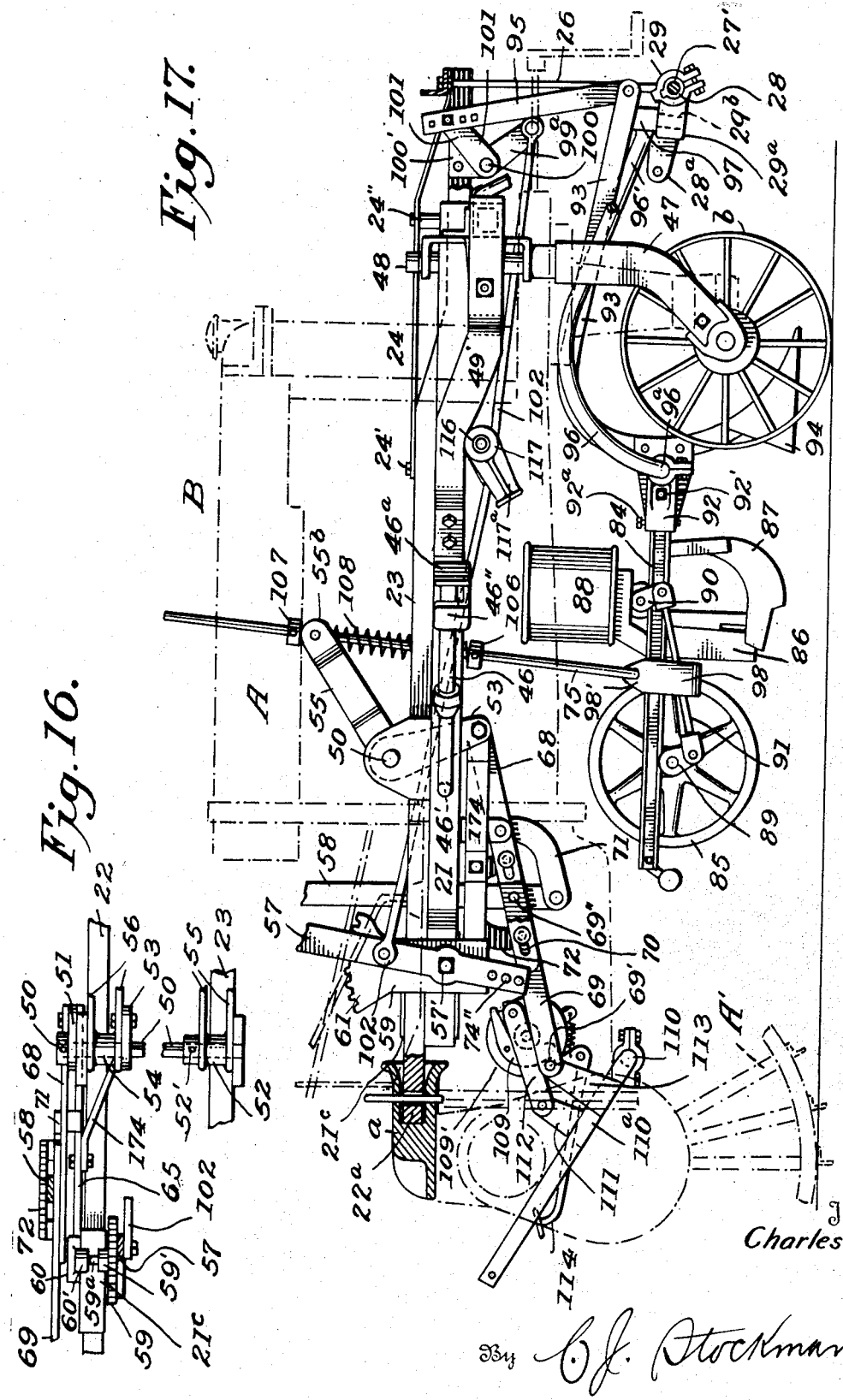
Inventor
Charles T. Ray.
By C. J. Stockman
Attorney

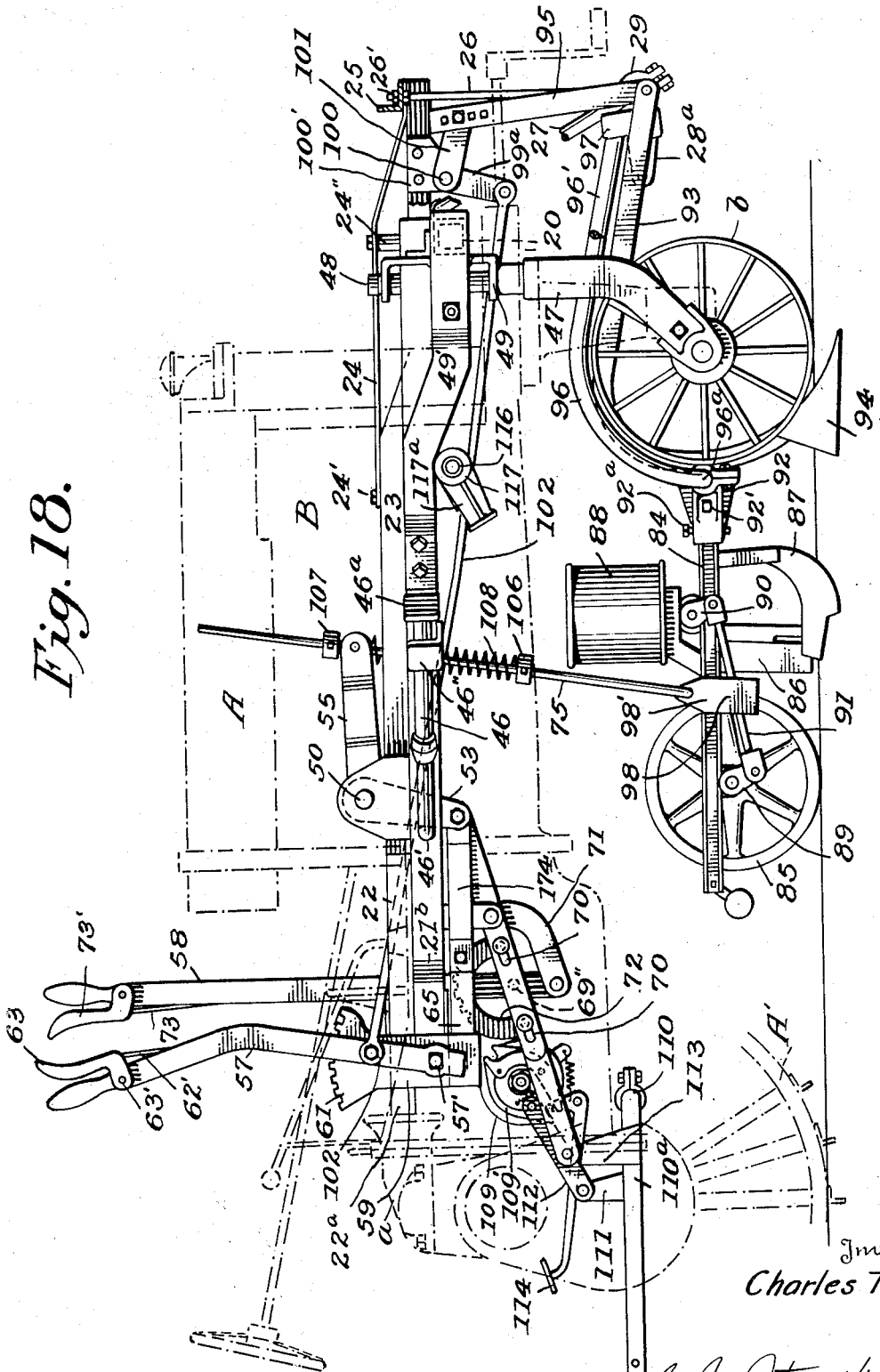

Dec. 8, 1936.  C. T. RAY  2,063,851
TILLAGE IMPLEMENT
Filed July 15, 1932  13 Sheets-Sheet 9

Inventor
Charles T. Ray.
By C. J. Stockman
Attorney

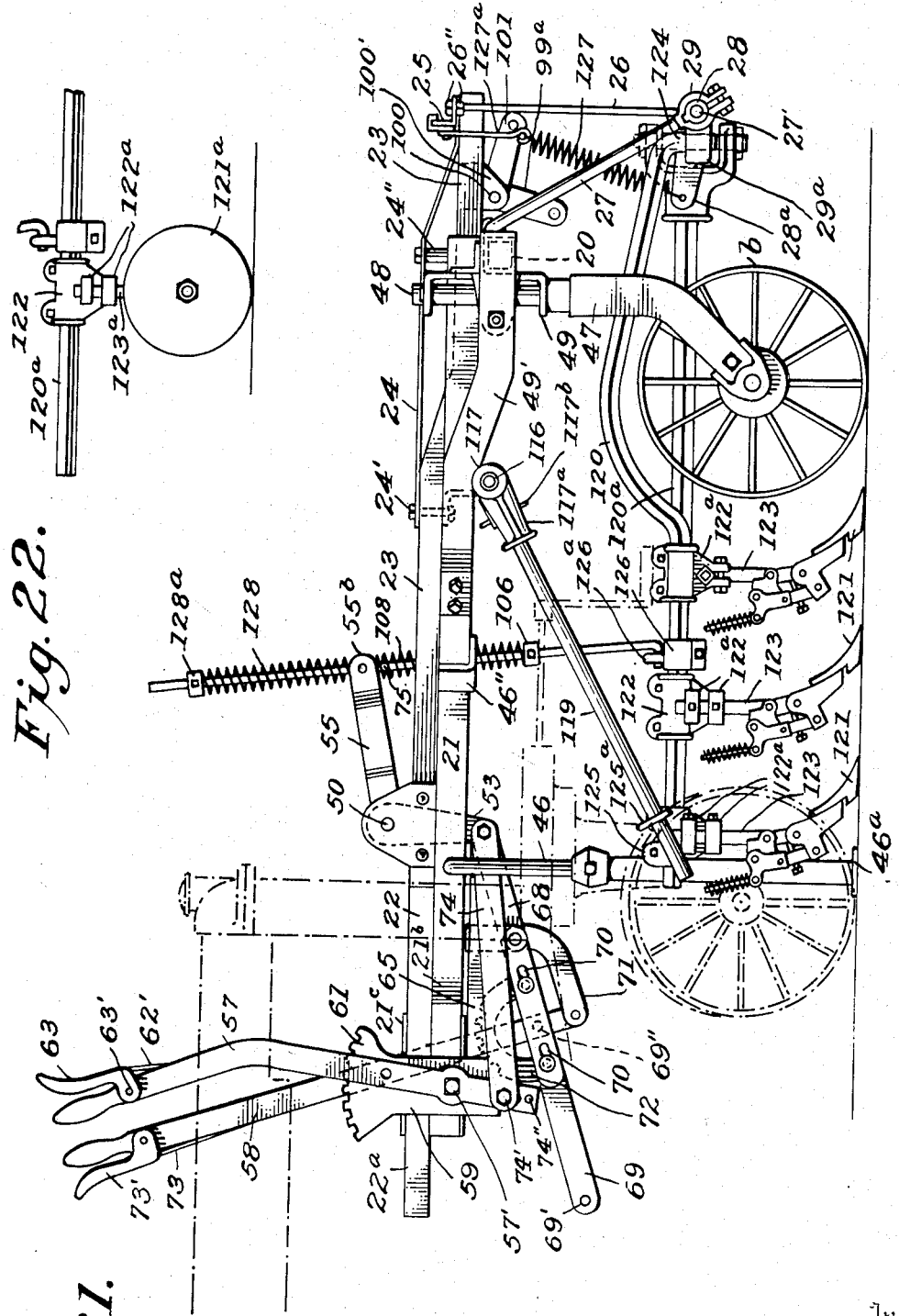

Dec. 8, 1936.   C. T. RAY   2,063,851
TILLAGE IMPLEMENT
Filed July 15, 1932   13 Sheets-Sheet 11
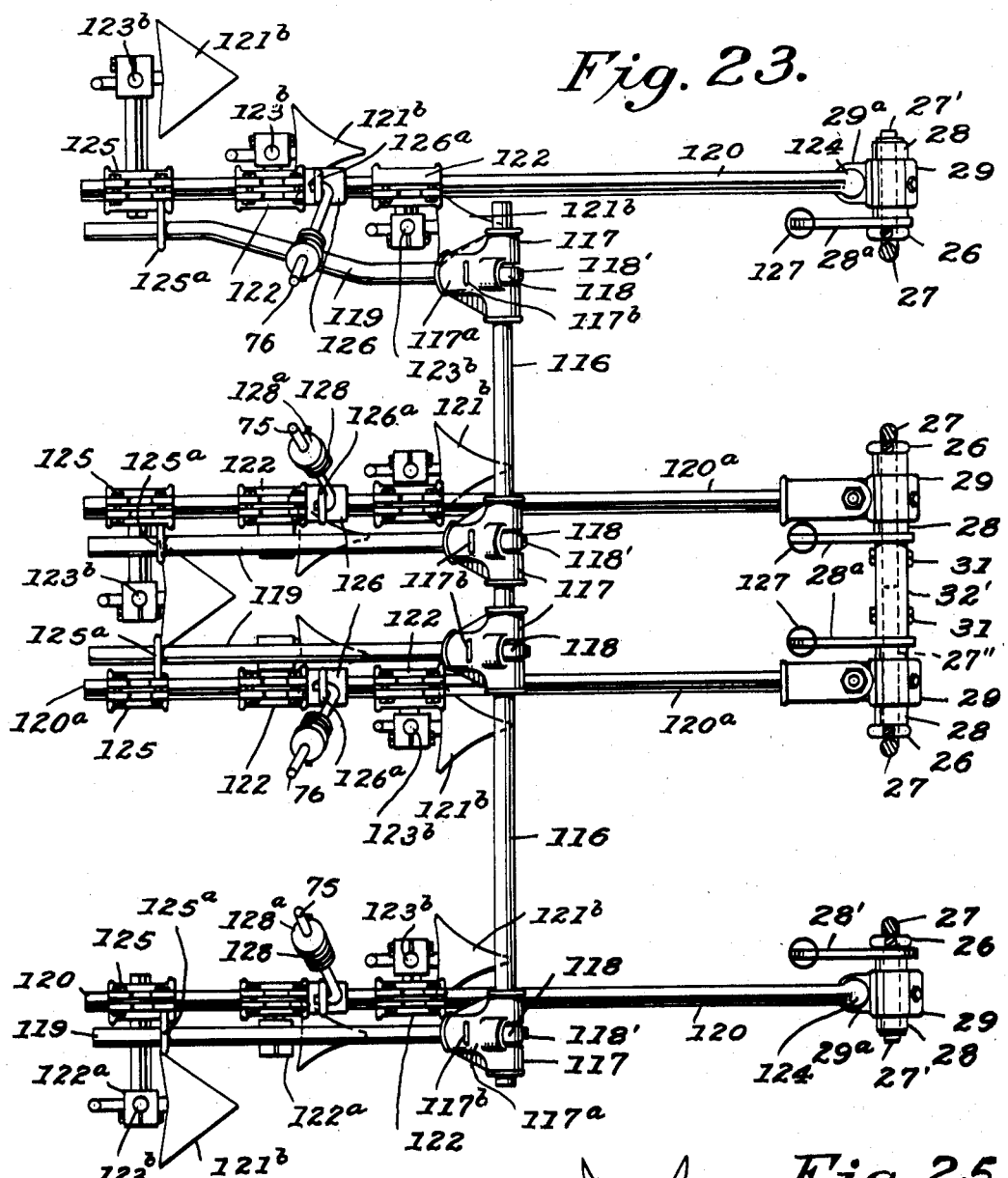
Fig. 23.
Fig. 24.
Fig. 25.
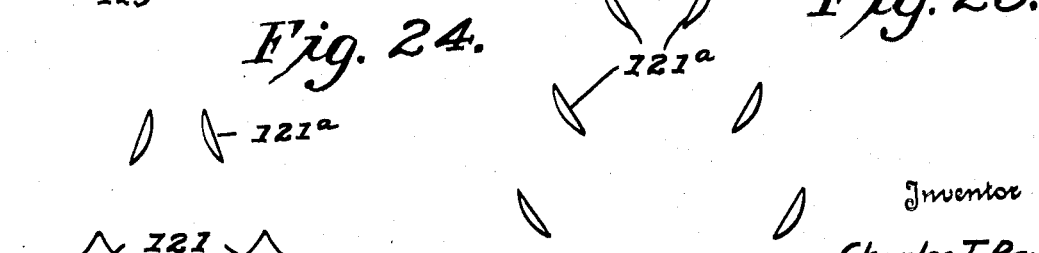
Inventor
Charles T. Ray.
By C. J. Stockman
Attorney Dec. 8, 1936. C. T. RAY 2,063,851
TILLAGE IMPLEMENT
Filed July 15, 1932  13 Sheets—Sheet 12

Inventor
Charles T. Ray.
By C. J. Stockman
Attorney

Dec. 8, 1936.   C. T. RAY   2,063,851
TILLAGE IMPLEMENT
Filed July 15, 1932   13 Sheets-Sheet 13

Inventor
Charles T. Ray.
By C. J. Stockman
Attorney

Patented Dec. 8, 1936

2,063,851

UNITED STATES PATENT OFFICE 2,063,851

TILLAGE IMPLEMENT

Charles T. Ray, Louisville, Ky., assignor to B. F. Avery & Sons Company, Louisville, Ky., a corporation of Delaware Application July 15, 1932, Serial No. 622,757

80 Claims. (Cl. 97—47)

This invention relates to improvements in combined tractors and agricultural implements designed for row-crop operations and particularly of the type in which the parts which act upon the soil are carried by a wheeled frame formed to provide a longitudinal opening into which the tractor may be driven for assemblage with the implement and from which it may be backed out when the tractor is to be used for purposes other than as a propelling means for the implement—means being provided for releasably attaching the tractor and implement to each other.

These implements are usually of a four-row type and the instant invention, accordingly, illustrates means for the simultaneous treatment of four rows, but this number may be varied and hence in a material sense may be regarded as being exemplary. However, I deem the simultaneous treatment of four rows as being proper, although I recognize the fact that the principles of the invention are applicable, in substance, to implements designed for the simultaneous treatment of more or less than four rows and hence do not confine myself to that precise number.

In the accompanying description the term "tractor" is self-explanatory, and includes the parts applied thereto which adapt it for use in relation to the implement. The term "implement" refers to the wheeled frame with which the tractor is to be releasably connected, together with the means for connecting it to the tractor, and includes the means adapting it to carry the means, hereinafter referred to as "attachments", which act upon the land, in planting, in cultivating, or otherwise, and also includes the means by which said "attachments" are adjusted in regulating the depth at which they are to operate and the connections by which the adjusting means are connected to elements of a power lift mechanism forming part of the tractor.

"Attachments" of various different types are illustrated in the accompanying drawings. These "attachments" are respectively designed for planting, for cultivating, and for the cutting of stalks. The cultivating attachment, moreover, may be of different types, namely, those whose soil treating elements are in the form of shovels or in the form of sweeps or in the form of discs, or selected combinations of shovels, sweeps and discs.

One of the important purposes of this invention is to provide a means for connecting the implement frame to the tractor, characterized in that it permits relative movement of the frame and tractor about a horizontal axis, whereby either the frame or the tractor may tilt sidewise, one relatively to the other, in accord with the contour of the land engaged by the wheels of the tractor or the wheels of the implement.

Another of the important purposes of the invention is to so construct the implement frame that the portion thereof on either side of the tractor may tilt laterally without imparting tilting movement to the portion thereof on the other side of the tractor or to the tractor itself.

Still another important purpose of this invention is to provide a construction of implement frame and adjunctive parts adapting it for the application thereto of attachments of different kinds and for different purposes—such as planting, cultivating, stalk cutting, etc.

A general purpose of the invention is to provide an implement of the type whose front end is releasably connectible to means which will be disposed on opposite sides of the tractor when the implement and tractor are assembled, and which implement is characterized by maximum flexibility of its parts, by the ease with which its ground-working means may be adjusted to operate at different selected depths, may be raised and lowered from and into working position, and may be interchanged quickly to bring about a different operation, as from planting to cultivating, or from either planting or cultivating to stalk cutting, for example.

In the accompanying drawings illustrating the invention and wherein like characters of reference denote corresponding parts in the several views:

Fig. 1 is a plan view and Fig. 2 is a front elevation of the implement with the tractor in operative relation therewith and with all the attachments omitted; that is to say, these figures illustrate the implement in its assembled relationship with the tractor and in condition to receive any of the attachments which are to be applied thereto according to the nature of the operation to be performed;

Fig. 3 is a front elevation of the implement, with its attachments omitted and before it has been assembled with the tractor;

Fig. 4 is a front elevation of one of the side or half sections of the implement and a part of the other half section, with the tractor and all of the attachments omitted;

Fig. 5 is a plan view of one of the half sections before the tractor or any of the attachments have been applied thereto;

Fig. 6 is a side elevation of the implement with all of the attachments omitted;

Figure 1:
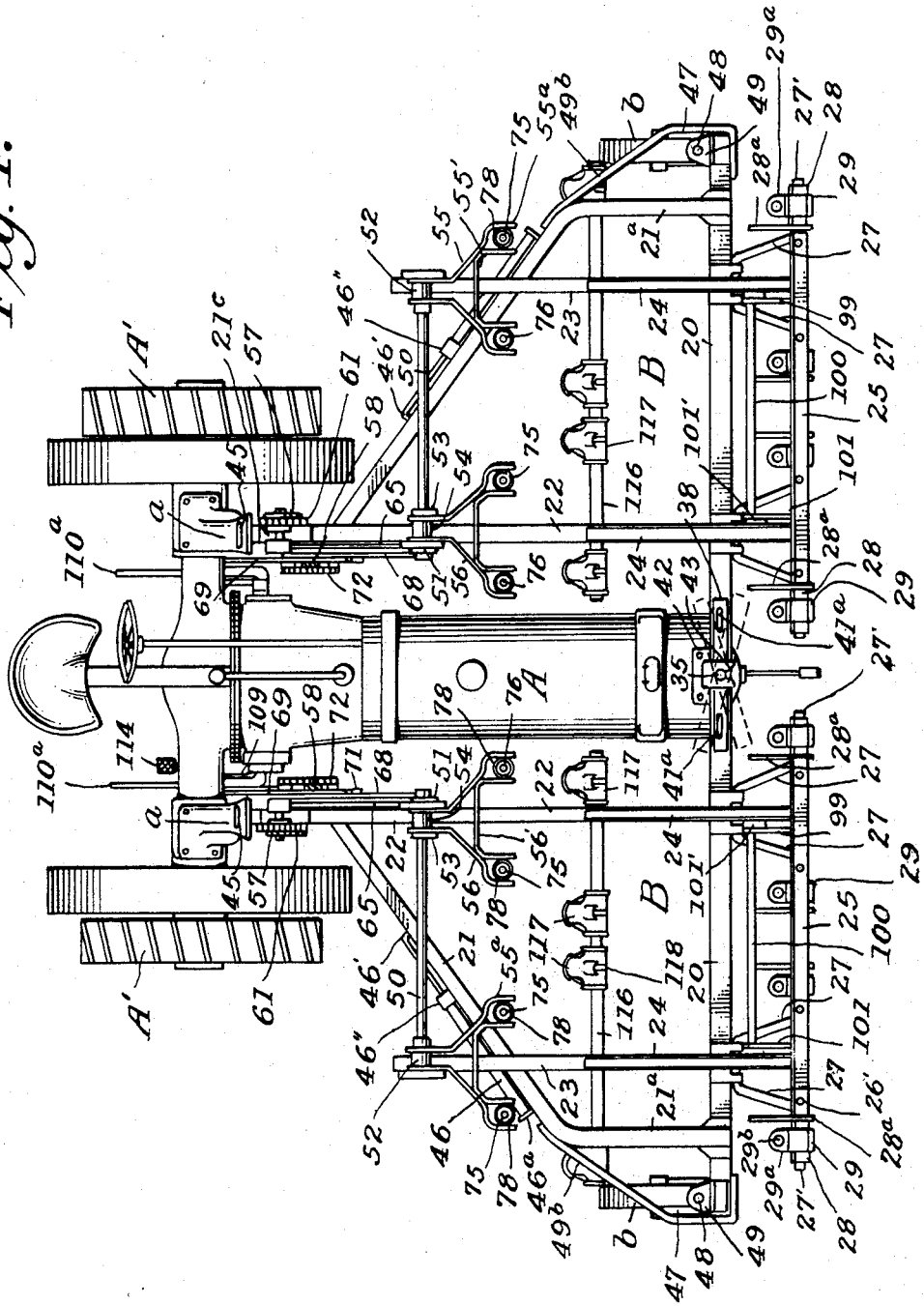
Figure 19:
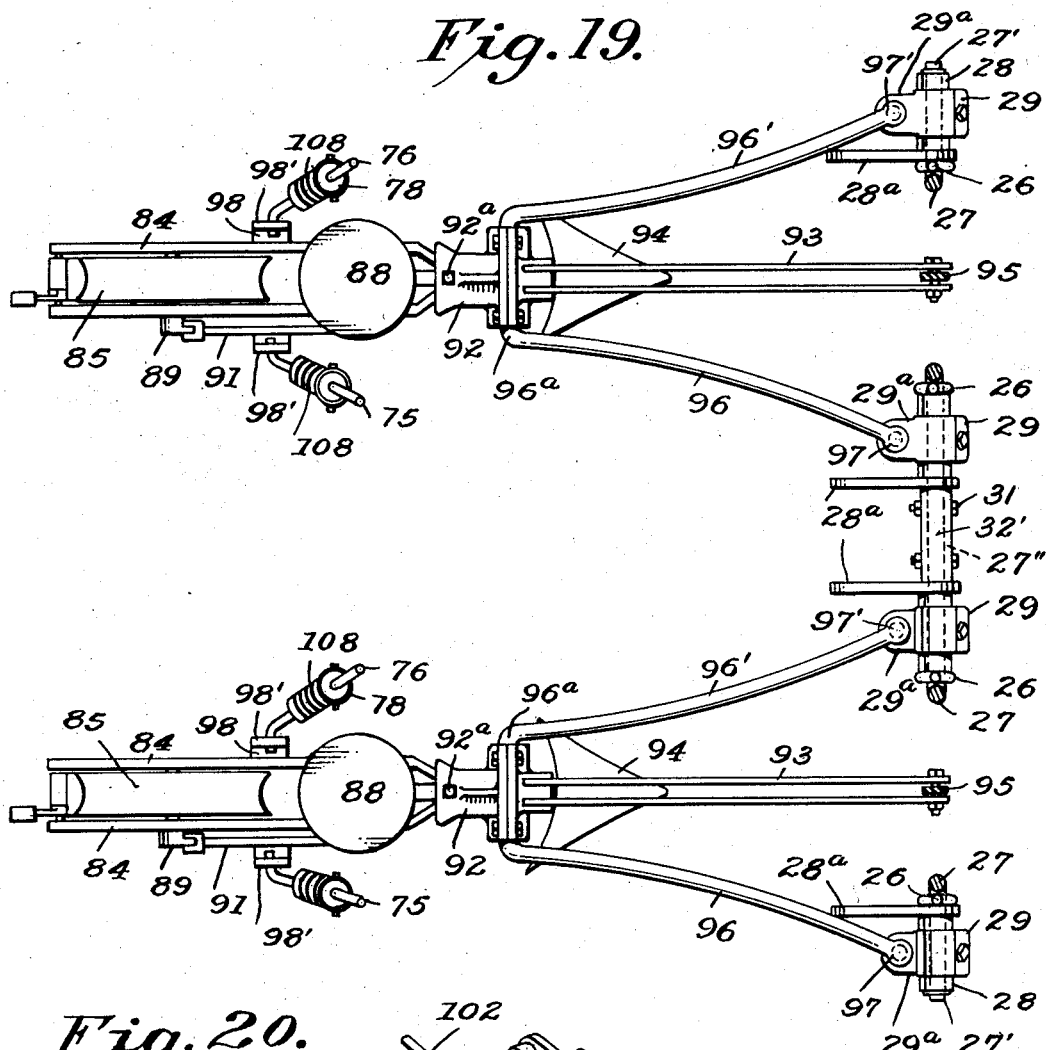
Figure 20:
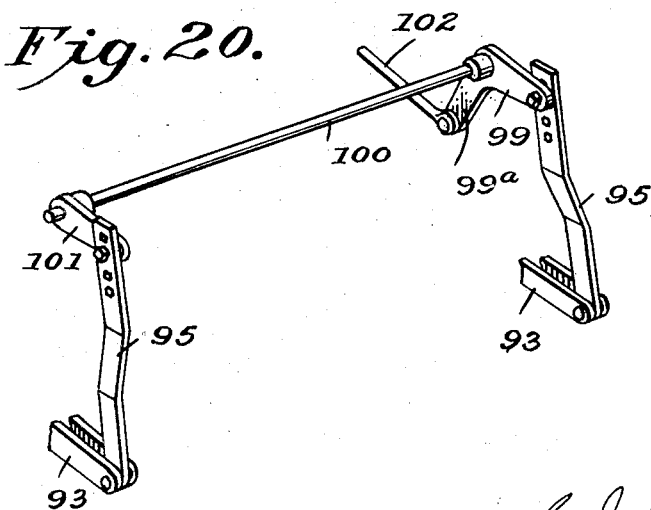
Figure 26:
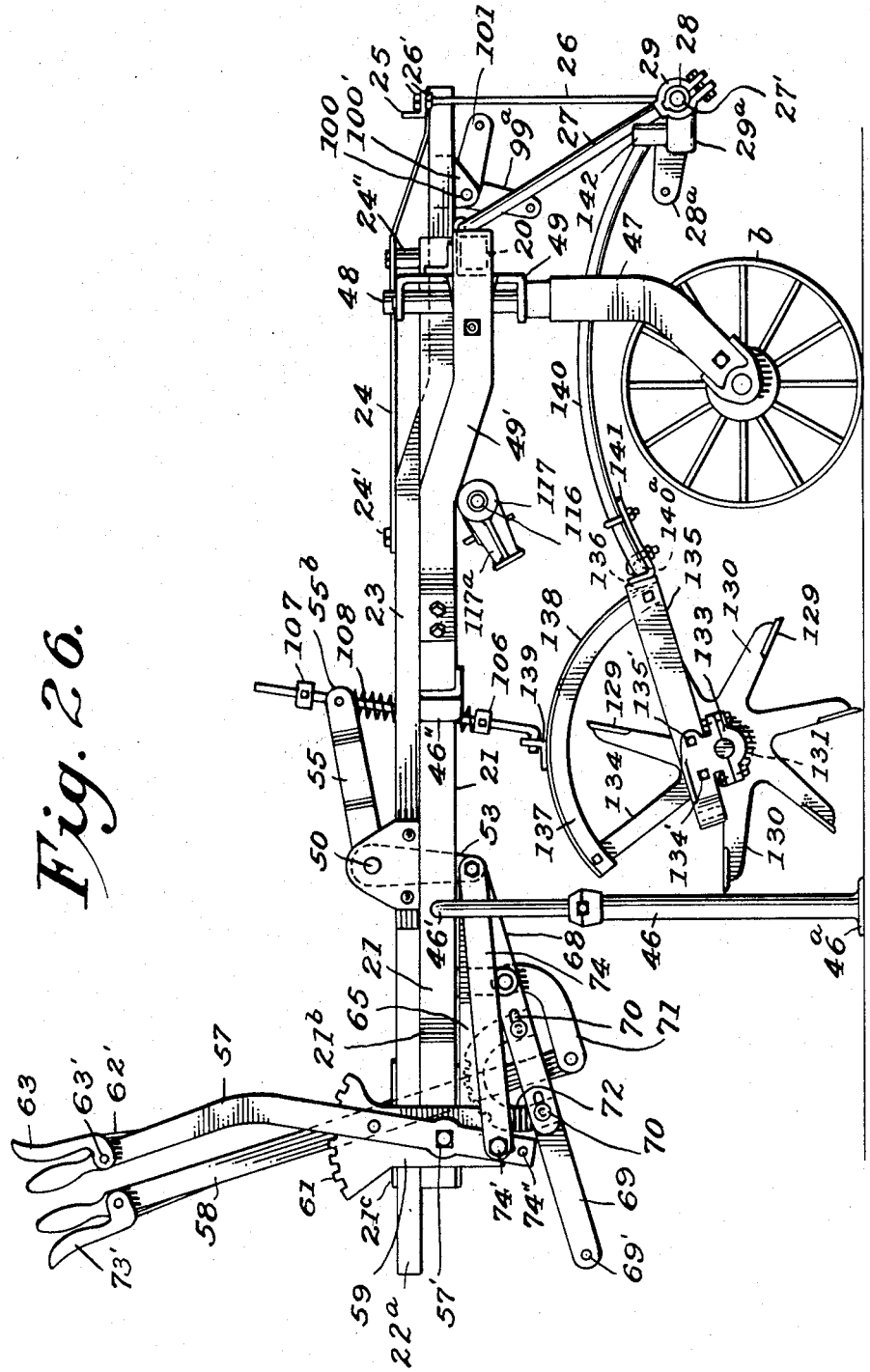
Figure 27:
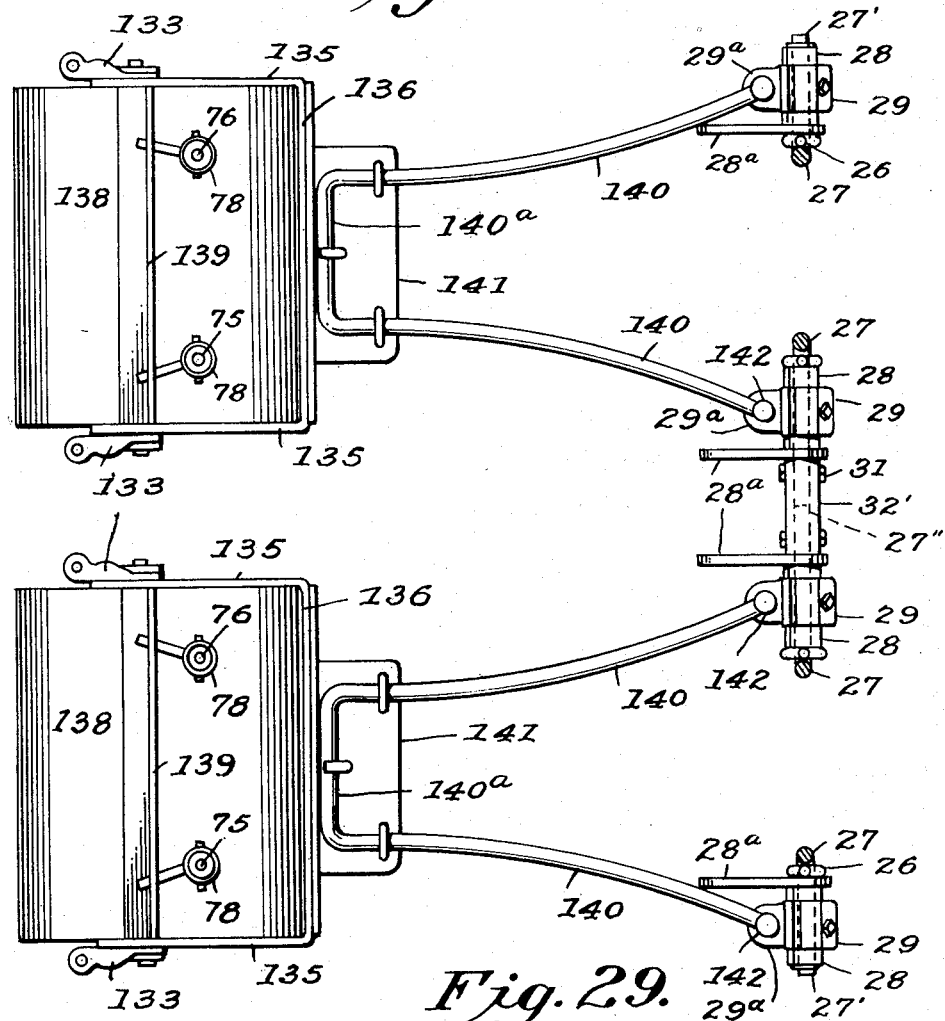
Figure 28:
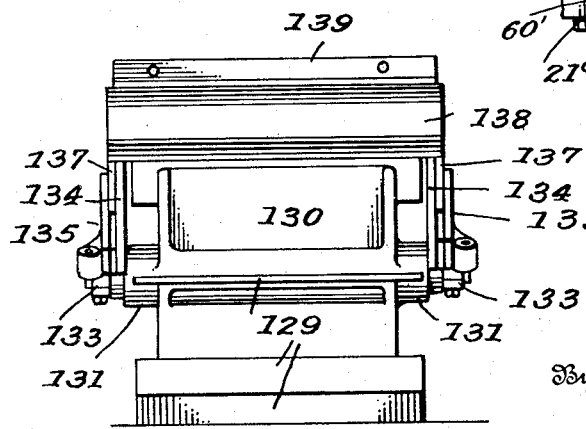

Figs. 7, 7ª, 8, 9, 10, 11, 12, 13, 14, 15 and 16 are detail representations of certain of the important parts of the implement;

Fig. 17 is a side elevation of the implement with a planting attachment applied thereto and with the tractor shown in dot-and-dash outline, the planting attachment being illustrated in its transport position;

Fig. 18 is a view similar to Fig. 17, but shows the planting attachment in its operative position;

Fig. 19 is a view illustrating two of the planting attachments and particularly intended to show their draft connections to the implement;

Fig. 20 is a detail representation of a part of the means by which the depth at which the pair of planting attachments of either half section of the implement shall operate is adjustably regulatable;

Fig. 21 is a side elevation of the implement and a cultivating attachment applied thereto and shows the tractor in dot-and-dash outline in the position it occupies when either entering or leaving the implement;

Fig. 22 is a detail representation showing a disk which may be employed in lieu of a shovel or a sweep as a ground-treating element;

Fig. 23 is a plan view particularly intended to show the relative position of cultivating attachments applied to either half section of the implement;

Fig. 24 is a diagrammatic representation to suggest the possibility of using disks and shovels or sweeps in certain relative positions upon adjacent cultivating attachments;

Fig. 25 is a view showing the preferred relative arrangement of the disks when employed to replace all the shovels or sweeps;

Fig. 26 is a side elevation of the implement with a stalk cutting attachment applied thereto and shows the same before it has been assembled with the tractor;

Fig. 27 is a detail plan representation particularly intended to show the draft elements of the stalk cutting attachments and the connection of said draft elements to the implement;

Fig. 28 is a front elevation of one of the stalk cutting attachments; and

Figure 29:
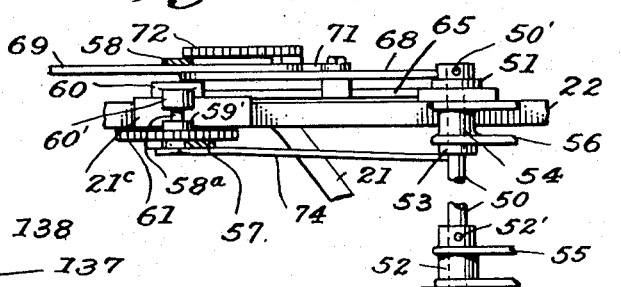

Fig. 29 is a detail representation of certain parts of the adjusting and tensioning means for the cultivating and stalk cutting attachments.

A designates a tractor adapted for row crop operation. This tractor, except as hereinafter pointed out, may be of any suitable construction for which no novelty is claimed. It is of the type whose rear end is supported by two widely spaced ground-engaging wheels $A^1$, and whose front end is supported by a pair of ground-engaging wheels $A^2$ which are mounted close to each other at the longitudinal center of the tractor and are toed in toward each other. (See Fig. 21.)

The main frame of the implement is composed of two similar half sections B, B, each provided with a carrying wheel b, mounted at the outer side of its forward end. These two half sections B, B are spaced from each other transversely of the implement and receive the tractor A between them. Their forward ends are connected with each other and with the front end of the tractor by means characterized in that when said sections are assembled with each other and are in operative relationship with the tractor each section is capable of sidewise tilting movement relatively to the other and to the tractor in accord with the contour of the land engaged by the respective wheels, b, and the tractor similarly is capable of sidewise tilting movement relatively to the said sections in following the contour of the land traversed by the respective tractor wheels $A^1$. In other words, the connections between the two side sections of the frame and between said sections and the tractor are such that when either wheel b of the implement or either wheel A' of the tractor traverses a hump or hollow sufficient to cause sidewise tilting movement of said section or said tractor, said sidewise tilting movement will not be transmitted to the other section or from the tractor to either section. The frame construction and adjunctive members applicable to all the attachments will first be described as illustrated by Figs. 1–7, in which all of the attachments are omitted, with reference also to the detail representations in Figs. 7–15, inclusive; and since each half section B is identical with the other half section the description will be particularly directed to the parts of one half section which, it will be understood, are duplicated upon the other half section.

20 designates a transverse frame member to which is connected a member whose major portion (marked 21) extends diagonally of the frame and whose forward and rearward ends (marked $21^a$ and $21^b$, respectively) extend longitudinally of the frame. These three portions of the member referred to are preferably of integral formation. The longitudinally extending forward end portion $21^a$ is secured to the member 20 near the outer end of the latter. The longitudinally extending rear end portion $21^b$ (see Fig. 7) is mounted in a holder $21^c$ of angular cross section and upon it is superimposed the rear end of a longitudinal member 22, which, also, extends through said holder. A bolt $22^a$ (Fig. 7) extends through the upper and lower members of the holder and through said end portion $21^b$ and the end of the member 22 and rigidly secures these parts to each other within the channel provided by said holder. The member 22 projects rearwardly beyond the rear end of the member $21^b$, at $22^a$, and when this section B is assembled in operative relationship with the tractor the projecting end $22^a$ is loosely received in a socket a provided at the corresponding side of the tractor (see Figs. 1 and 14). The member formed of the parts 21, $21^a$ and $21^b$ and the member 22 are preferably metallic and tubular in cross section for the sake of strength without unnecessary weight. The rearwardly projecting ends $22^a$ of the respective longitudinal members 22 receive the thrust imposed by the tractor in propelling the implement and said thrust is transmitted through the members 22 to the remaining elements of the respective side sections of the frame.

The frame of each side section B also includes a fourth member, 23, which is disposed in a parallel relation with the member 22 and is arranged near the outer side of said section. The members 22 and 23 extend forwardly, as well as rearwardly from the transverse member 20 and are superimposed upon the latter. They are each bent upwardly, commencing at a place somewhat rearward of the member 20, and extend thence horizontally, whereby their forward end portions will be in a lower horizontal plane than their rear end portions. The rear end portion of the member 23 is superimposed on and rigidly secured to the diagonal member 21. Bracing members 24, 24, have their rear ends suitably secured at 24' to the portions of the members 22 and 23 which are in the higher plane and their forward portions secured to the front ends of said members 22 and 23, and these bracing members are connected between their ends with said members 22 and 23 by elements 24" of a supporting and fastening nature. Said bracing members extend substantially horizontally from the higher portions of the respective members 22 and 23 and thence at a downward inclination to the front ends of said members, and the supporting and fastening elements 24" are arranged adjacent the junctions of their horizontal and inclined portions. Accordingly, they form braces of a truss nature. The front ends of the members 22 and 23 and braces 24, 24 are secured to and support a transverse member 25 which is disposed forward of the member 20 and is preferably angular in cross section. Extending downwardly from the horizontal part of the member 20 are four hangers 26, the upper end of each of which is secured preferably by two locking nuts 26' respectively arranged above and below the horizontal part of the member 25. (See Fig. 4.)

The lower end of each hanger 26 is formed to provide a bearing and the bearings of two adjacent hangers respectively receive projections 27', 27'', extending laterally, in opposite directions, from the free end of the corresponding side arms of an arch-shaped member 27. (See Figs. 2, 3, 4 and 10.) Sleeves 28 are rotatably mounted on the lateral projections 27', 27'', and each of these sleeves is provided at its inner end with a crank arm 28ª for a purpose hereinafter explained. These crank arms are rigidly connected with their respective sleeves. A clamp 29 is mounted upon each sleeve and is keyed thereto to rotate therewith, as shown best in Figs. 7, 10 and 11. Each clamp is provided with a rearwardly extending lug or projection 29ª formed with an opening 29ᵇ. The forward ends of the planting, cultivating or other attachments, are connected to the lugs or projections 29ª, said attachments having downward projections, hereinafter set forth, which respectively enter the openings 29ª. The clamps 29 thus provide means by which a tractive connection is effected between the arch-shaped members 27 and the sleeves 28, through which forward movement of the implement is transmitted to the attachments. It is to be noted that the sides of the arch-shaped member 27 and the hangers 26 extend downwardly at the sides of the respective plant rows.

The lateral projections 27'' of the two arch-shaped members 27 of each half section of the frame extend through the corresponding sleeves 28 and toward each other from the inner ends of said sleeves, preferably into an abutting relationship with each other, as shown in Fig. 10. Surrounding the portions of these projections 27'' which lie between the confronting faces of the cranks 28ª at the ends of the corresponding sleeve 28 is a spacing sleeve which in practice is preferably formed of complementary semi-cylindrical half sections, 32, 32', secured by bolts 31 to each other and to said projections 27''. Hence the two arch-shaped members 27 of each half section of the frame are rigidly secured to each other. In fact, the pair of arch-shaped members 27, the forward portions of the longitudinal frame members 22 and 23, the transverse frame member 24 and the pair of hangers 26, form a rigid frame structure adapting the main frame of the implement to support certain different kinds of attachments, for different agricultural operations, respectively, (as cultivating, planting, etc.) whose forward ends are connected to said frame through the medium of the clamps 29 hereinbefore referred to.

It will be understood that there is one arch-shaped member 27 for each row to be planted, cultivated or otherwise treated and that the central portion of each arch is positioned above the corresponding row. It will also be understood that the term "row" as used herein means the line along which the seeds are planted or from which the growing plants extend.

As has already been stated, the foregoing description of the construction of the main frame 10 of the implement, including the hangers, arch-shaped members, and the adjuncts to which the attachments are to be connected, while particularly directed to one of the two side sections of the implement, applies equally to the other half section, and the latter, accordingly need not be described in detail.

Reference has already been made to the fact that these two side sections of the frame are pivotally connected with each other to have relative movement about a horizontal axis in following the contour of the land traversed by their respective wheels, b, b. The means for thus connecting them with each other is shown best in Figs. 4 and 12 and is as follows:—

The confronting ends of the front longitudinal members 20, 20 are respectively provided with hinging projections 33, which extend from said members into an overlapping relationship with each other and have their overlapping ends journalled upon a horizontal pivot bolt 34. The ends of said projections opposite the pivot bolt are rigidly secured to the ends of the respective frame members 20. Said pivot bolt is supported by a hanger 35 which has an eye 36 at its lower end and a flange 37 above said eye. For a purpose to be hereinafter explained, the upper end of the hanger 35 is adjustably secured to a bridging member 38, through which it extends. A convenient means for attaching it adjustably to said bridging member includes a nut 39 upon the upper end of the hanger. A wear plate 40 is preferably provided between the nut 39 and the upper surface of the bridging member 38. This bridging member 38 is provided near its ends with devices, 41, here shown as screws whose upper ends are formed into cranks 41ª to enable them to be conveniently turned by hand. When the two side sections B, B of the main frame of the implement are in an assembled relationship with each other, but are not connected to the tractor, these two screws are turned down to impinge upon the upper surfaces of the respective members 20, and thereby hold said members, and consequently the said side sections, in a relationship which is rigid one with the other. When, however, these sections are in an operative relationship with the tractor the bridging member is in a position in which the ends of the screws 41 will not be in the path of pivotal movement of either section, as shown in dotted outline in Fig. 1. If desired, the bridging member may be pivotally mounted upon the hanger 35 to be movable out of the path of pivotal movement of members 20 when the latter have been released for their said pivotal movement, but pivotal mounting of the bridging member on the hanger is not essential.

Connection between the members 20 and the front end of the tractor is effected through the medium of a bracket which, as shown best in Fig. 12, includes a base flange 42, a pair of spaced jaws 43 and a member 44 which projects upward from the base flange and carries said jaws. This bracket is secured to the front end of the tractor by appropriate fastening elements which extend through openings 42ª in the base flange 42, and, when the tractor is in operative relationship with the implement, the jaws 43 extend into the space between the flange 37 of the hanger and the under surface of the bridging member 38 and are disposed on opposite sides of the stem of the hanger 35. A wear plate 40' secured to the under surface of the bridging member is interposed between the latter and said jaws. When the tractor and implement are thus assembled, the bridging member 38 acts as a pad between the nut 39 and the upper surfaces of the jaws 43, through which pad the weight of the transverse frame members 20 is imposed upon the upper surfaces of said jaws.

In bringing about this assemblage the tractor is moved into the space between the longitudinal frame members 22 of the two side sections of the main frame, until the jaws 43 pass on either side of the stem of the hanger 35. At this time said members 22 will have been caused to enter the sockets a, at the corresponding sides of the tractor. It will be noticed (see Fig. 14) that the mouths of these sockets are bell-shaped or flared to facilitate entrance of the ends of the members 22 into the sockets. The relative sizes of the inner portions of the sockets, in which the members 22 are to be seated, and said members are such as to provide clearance sufficient to enable the tractor to tilt sidewise without communicating similar movement to the implement. It will also be noticed (see Fig. 12) that the space between the jaws 43 is flared to facilitate the entrance of the hanger 35 thereinto. Pins 45 (Fig. 15) which are adapted to extend loosely through openings 45ª in the projecting ends 22ª of the respective members 22, are inserted when the parts have been assembled and hold the frame of the implement against longitudinal movement relatively to the tractor. It will be understood that, when these pins have been thus inserted through said sockets a through the ends 22ª of the members 22, it will be impossible for the hanger 35 to be released from the jaw members of the bracket. In order to prevent excessive wear, the hanger 35 is adjusted upwardly by the nut 39 to thereby draw the flange 37 up under the bridging member 38.

When it is desired to disconnect the tractor from the implement, the pins 45 are withdrawn to thereby release the members 22. The nut 39 is then slackened and the bridging member 38 is turned to bring its screws 41 into impinging relationship with the members 20. These screws are then turned to release the bridging member from its tight frictional engagement with the jaws 43. The tractor may now be backed out of the implement, assuming that other connections, hereinafter set forth, between the attachments and the tractor have also been released.

Legs 46, having ground-engaging foot pieces 46ª, are employed as supports for the implement when the tractor is not in operative relationship with the latter. These legs are shown in their implement-supporting position in Figs. 3, 4, 6 and 26. When the tractor is in operative relationship with the implement, they are in an elevated position out of contact with the land. As here shown, they are pivoted at their upper ends to an appropriate member of the frame of the implement, as at 46', whereby they are adapted to lie horizontally against said frame member when in non-operating position, as shown in Figs. 17 and 18. When in their latter position they are held by keepers 46''. Thus, they co-operate with the wheels b, b in supporting the frame and its attachments. They are swung downward into implement-supporting position before the tractor is withdrawn from the implement and remain in said position until the tractor has been reconnected to the implement. They are preferably of telescopic nature, as shown, to adapt their length to be regulated so as to effectively engage the land.

The wheels b, are of castering nature and, as here shown, are mounted in yokes 47 from whose upper ends pivots 48 extend and are journalled in brackets 49 mounted upon the ends of the transverse members 20, respectively. The brackets are braced by members 49'.

Each half section of the main frame of the implement is provided with a mechanism of special nature, for variably regulating the depth at which the corresponding attachments, when of planting or cultivating nature, shall work and for variably tensioning said attachments to cause them to work at the depth to which they have been set, regardless of the contour of the land, and also for raising and lowering the attachments. When the attachments are of stalk cutting nature the mechanism referred to serves to hold the cutting elements thereof down upon the land with a yielding pressure sufficient to cause them to rotate by their engagement with the land and to overcome their tendency to stop rotating or to rebound when they come into contact with stalks to be severed. Since these mechanisms of the respective half sections are duplicates of each other a description of one of the same will be understood as applying to the other.

50, 50 (see Fig. 1) designate transverse rock shafts respectively journalled on the corresponding half sections of the main frame of the implement. Near the inner end of each rock shaft—that is, near the end thereof adjacent the tractor when the implement is attached to the tractor—there is secured, as by a pin 50', (Fig. 8) the upper end of a crank arm 51. A sleeve 52 is mounted near the outer end of each of said shafts and is fixed thereto, as by a pin 52'. A second crank arm, 53, is mounted on each rock shaft adjacent the crank arm 51. This second crank arm is mounted to be movable pivotally relatively to the crank arm 51 and about the shaft 50 as its axis, being carried by a sleeve 54, mounted loosely on said shaft. The crank arm 53 and sleeve 54 are preferably integral with each other. Each sleeve 52, 54 is provided with a pair of connected side arms which project forward from the ends thereof and are rigid therewith, being preferably of integral formation with their sleeves. The arms of the sleeve 52 are marked 55, 55 and the arms of the sleeve 54 are marked 56, 56. The arms 55, 55 and 56, 56, together with their sleeves 52 and 54, form lifting yokes and are operatively related to tensioned lifting rods 75 whose lower ends are respectively adapted for connection to the frame of the planting, cultivating or stalk cutting attachments, as hereinafter particularly set forth.

57 and 58 designate two manually operable levers which are mounted on each half or side section B of the implement frame and are arranged to be within convenient reach of the operator on the seat of the tractor.

It will be recalled that the rear end 21ᵇ of one longitudinal member and the rear end of a second longitudinal member 22 of each section of the main frame of the implement are mounted one upon the other and extend through a holder 21ᶜ within which they are rigidly secured to each other and to said holder by a bolt 22ᵃ (Fig. 7). 59 and 60 designate members which complementarily form a slide. These members 59, 60 are provided with bosses 59', 60' arranged above and below the holder 21ᶜ, and bolts 59ᵃ, 60ᵃ extend through these bosses and rigidly secure the members 59 and 60 to each other, into a unitary structure. The member 59, which forms one side of the slide, has its upper end formed to provide a toothed segment 61.

The lever 57 is fulcrumed, between its ends, to the slide member 59, at 57', and is provided with a spring-pressed latch 62 to engage in any of the teeth of the segment 61. This latch serves to hold the lever 57 in any position to which it has been set relatively to said segment and is connected, as usual, with a grip member 63, pivoted at 63' to the lever 57. In the illustrated embodiment, the connection between the latch and its grip member is provided by prolonging the stem, 62', of the latch and pivoting its upper end to the grip member.

The member 60 of the slide is provided with an arm 65 (see Figs. 5, 6, 18 and 22) which is preferably integral therewith and projects forwardly therefrom and is connected to the fast crank 51 by a pivot 66 (see Fig. 8). To this pivot 66 the lever 58, also, is connected by a means which includes a link whose forward end is mounted on the pivot 66 and to whose rear end a member of a power lift mechanism, hereinafter described, is pivotally connected at 69'. This link (see Figs. 5, 6, 16, 17, 18, 22 and 26) is composed of two members 68 and 69 having pin and slot connections with each other, as shown at 70, 70, and it extends in a downward and rearward direction from the pivot 66 (upon which its member 68 is mounted, as shown best in Fig. 8) to the pivotal point 69'. The lever 58 is fulcrumed near its lower end, at 69'', upon the link-member 69 and its lower end is connected with the link-member 68 by a link 71. Said member 69 is provided with a toothed segment 72 which cooperates with a spring-pressed latch 73, carried by the lever 58, in holding the latter and consequently the link members 68 and 69 in the positions to which they have been adjusted relatively to each other. The latch 73 is connected with a grip member 73' to be conveniently releasable from the toothed segment, as usual.

It will be evident that by releasing the lever 58 from the segment 72 and moving its upper end forward or rearward about its fulcrum upon the link-member 69, power will be applied from the lower end of said lever and through the link 71 to the complementary link-member 68 which thereby will be caused to slide relatively to said member 69 to the limit of the movement permitted by the slot and pin connection with each other. This movement increases or reduces the length of the link, considered as a whole, and correspondingly increases or reduces the distance between the pivot 66 at the forward end of the member 68 and the pivotal connection, at 69', of the member 69 with a member of the power lift mechanism, hereinafter described. By said movement of the member 68 corresponding movement is given the fast crank arm and thence to the shaft 50 and, through said shaft 50, to the sleeve 52 fixedly secured to the other end of the shaft.

The loose sleeve 54 is moved rotatively on the shaft 50 by alternately employed connections—one of which is used when the planting attachments are operatively connected to the main frame of the implement and the other when the cultivating or stalk cutting attachments are employed in the stead of the planting attachments. The connection for rotating the loose sleeve when the cultivating or stalk cutting attachments are in use is provided by a link 74 (see Figs. 22 and 26) whose rear end is connected to the lever 57 and whose forward end is connected to the loose crank arm 53 projecting from said loose sleeve. This link is arranged to be disconnected from said lever and loose sleeve when the planting attachments are to be used. In the latter case, (see Figs. 17 and 18) the connection to said loose sleeve includes the slide arm 65 and a detachable link 174 which connects said arm 65 to the crank arm 53 of said loose sleeve, and is substituted for the link 74: it being recalled that the arm 65 projects from the member 60 of the slide and is mounted at its forward end upon the pivot 66 of the fast crank arm. In short, when the cultivating or stalk cutting attachments are in use the loose sleeve 54 is rocked from the lever 57, through the link 74, whereas when the planting attachments are in use said loose sleeve is rocked from the lever 58 through the medium of the fast crank arm 51, slide arm 65 and the slide, and the member 174.

In making the change to adapt this part of the mechanism to the cultivating and stalk cutting attachments, it is necessary only to disconnect the member 174 from the loose crank arm 53 and to connect said loose crank arm with the lever 57 by the link 74: and to change this part of the mechanism to adapt it to the planting attachments, it is necessary only to remove said link 74 and connect opposite ends of the member 174 to the slide arm 65 and the loose crank arm 53.

It will be apparent that rotative movement of the fast sleeve 52 will correspondingly raise or lower the arms 55 which project from said sleeve and that rotative movement of the loose sleeve 54 will correspondingly raise or lower the arms 56, projecting from the latter sleeve. In fact, the sleeve 52 forms a hub through which the inner ends of the arms 55 are connected with each other and are secured to the rock shaft 50 by the pin 52': and the sleeve 54 forms a hub through which the arms 56 are connected with each other at their inner ends and are journalled on said rock shaft.

The arms 55 and sleeve 52 form a yoke-shaped lifting member. A transverse brace 55' connects said arms to each other intermediate the ends of the arms. The free ends of said arms and brace are arranged to provide a pair of spaced forward projections 55ᵃ, 55ᵇ at each side of the forward end of the member. The arms 56 and sleeve 54 similarly are arranged to form a yoke-shaped lifting member and a transverse brace 56' is provided to connect the arms with each other between their ends. In this member, as in the other yoke-shaped lifting member, the forward ends of the arm 56 and brace 56' are arranged to provide a pair of spaced forward projections 56ᵃ, 56ᵇ at the opposite sides of the forward ends of this member. Mounted in the spaces between the projections 55ᵃ, 55ᵇ and in the spaces between the projections 56ᵃ, 56ᵇ are trunnion rings 78. The lifting rods 75 and 76, extend loosely through these rings and are provided with tensioning springs 108 and appurtenant adjustable stops or abutments 106 and 107, preferably in the form of collars slidably adjustable upon the rods and held in place by set screws, or other suitable fastening elements. The function of these rods will hereinafter be particularly described.

In practice, there are four planting attachments provided for the complete machine—two for each side or half section B of the implement. (See Fig. 19.) Each may be of any type or construction appropriate for use in a machine of this kind. Confining the description to the one shown in Figs. 17 and 18, which will be understood as applying equally to each of the others, since all are of like construction; its frame includes two longitudinal side members 84 which are spaced apart to receive the ground-engaging press wheel 85 and the seed chute 86 and opener 87 between them. Supported by said side members 84 is a seed hopper 88. Operatively related to this seed hopper is any suitable seed dropping mechanism operated by power derived from the travel of the wheel 85. It is unnecessary to enter into a description of the seed dropping mechanism, since a particular construction thereof does not form a part of this invention. It will be understood that the means for operating the seed dropping mechanism may be of any appropriate nature. The means here shown comprises a crank arm 89 attached to the axle of the wheel 85, a second crank arm, 90, connected to an appropriate element of the seed dropping mechanism and a link 91 connecting these two crank arms with each other.

The two side members 84 are brought together forward of the opener 87 and are mounted in a housing 92 upon a pivot bolt 92' which extends across said housing. This housing projects forward beyond the front ends of the member 84 and to its front end a sweep beam 93 is rigidly secured. The rear portion of this beam is curved and secured to the front end of the housing 92 at a place intermediate the top and bottom of its curved end. The bottom of the beam carries a sweep 94. The upper portion of the beam extends forwardly from the curved rear portion and has its front end arranged for attachment to the lower end of a link 95, hereinafter described. 96, 96' designate side members of a yoke-shaped draft element whose closed (rear) end 96ᵃ extends transversely of and is journalled within the housing 92. The free ends of these arms are provided with downward projections 97, 97', to be received, respectively, by the openings 29ᵇ in the lugs 29ᵃ which project from the clamps 29. It will be recalled that four of these clamps 29 are secured to the sleeves 28 and that these sleeves are rotatably mounted upon the laterally projecting ends 27' and 27'' of the arch-shaped members 27, and it will be understood that the side arms of each draft yoke are connected to two of these clamps through the medium of the projections 97, 97' at the free ends of said arms and the lugs 29ᵃ formed as a part of the clamps.

Suitable set screws 92ᵃ threaded, above and below, in the housing 92 are employed to adjust the positions of the side members 84 of the frame of the planting attachment relatively to the housing 92. The planter frame is provided with means of any suitable nature to which the lifting rods 75 are releasably connectible, the illustrated means for the purpose comprising a body member 98 (Fig. 19) which is suitably secured to the side members 84 of the frame and is formed with end flanges 98' having openings to receive the lower ends of said rods 75, the said ends being bent laterally to enter said openings.

It has been previously stated that the sweep beam 93 has its forward end arranged for attachment to the lower end of a link 95. It will be understood that since there are two planting attachments for each side or half section B of the implement, there will accordingly be two links 95 for the attachment thereto of the respective sweep beams 93. Upon reference to Fig. 20 it will be noticed that one of these links 95 has its upper end pivoted to one arm 99 of a bell crank lever, which bell crank lever is fixed to a rock shaft 100. The opposite end of this rock shaft is provided with a crank arm 101 to which the upper end of the link 95 of the other sweep beam is pivoted. As shown in Figs. 17 and 18, the bell crank lever has its arm 99ᵃ connected by a reach rod 102 with the lever 57 at a point above the fulcrum 57' of said lever. Each rock shaft extends transversely of the corresponding half or side section B and is mounted in bearings 100' suitably secured to appropriate members of the frame as indicated in Figs. 17 and 18.

Adjustment of the two planting attachments connected to either half or side section B of the implement in accord with the depth at which the seeds shall be planted is effected by swinging the upper end of the lever 57 rearward about its fulcrum 57' thereby correspondingly moving the reach rod 102 and turning the rock shaft 100 in its bearings. By this movement of the rock shaft the links 95 of both planting attachments are forced downward, thereby correspondingly lowering the front ends of the frames of the planting attachments through the medium of the sweep beams 93 since said beams are attached to the forward ends of said frames. When the depth at which the planter shall work has been thus initially regulated, the lever 57 is latched to its segment 61 to thereby hold the parts in adjusted position. The lever 58 is then released from its segment 72 and is operated to move the forward link-members 68 rearward upon its complementary link-member 69, to the limit of the slots in said member 68. This movement imparts corresponding rearward movement to the fast crank arm 51 to which said link-member 68 is connected. It also moves the slide members 59, 60 forward and hence imparts similar sliding movement to the arm 65 which is connected to said member 60'. Since this arm 65 is connected by the member 174 to the loose crank arm 53 the latter, with its loose sleeve 54 is turned on the shaft 50 and imparts corresponding movement to the lifting arms 56. Accordingly, said arms 55 and 56 are simultaneously swung downward by corresponding movement of the lever 58. Such downward movement of the outer ends of the lifting arms 55 and 56 is transmitted to the rods 75 through the trunnion rings 78, springs 108 and nuts 106, thereby imposing downward pressure on the frames of the planting attachments and this pressure operates to cause the ground-working parts to enter the soil at the beginning of the planting operation and to hold said ground-working parts and press wheels under tension which causes them to perform their respective functions effectively at the depth for which they have been set and to maintain said depth regardless of irregularities in the contour of the land in which the attachments are working. By adjusting the conection between the link 95 and the crank arm 101, the depth of entry of the sweep 94 into the ground is controlled.

For lifting the attachments from their working position to their fully raised or "transport" position and for lowering them from their said transport position to their working position, I have provided a "power lift" mechanism under control of the operative of the tractor and operated by power derived from the tractor. This power lift mechanism includes a clutch mounted on one side of the tractor and comprising a power driven driving member 109' and a driven member 109 which is normally disconnected from the driving member, together with elements of appropriate nature for clutching the driven member to the driving member under control of the operator of the tractor and for releasing it automatically from said driving member when it has made a predetermined partial revolution (preferably one-half of a complete revolution). Since the details of this clutch are not essentially a part of the present invention, it is deemed to be unnecessary to recite said details herein. A bail 110 journalled on the under side of the frame of the tractor and extending transversely thereof, is suitably connected with the driven member 108 of the clutch to cause it to be swung in clockwise and counterclockwise directions by successive partial revolutions of the clutch, and this bail is also suitably connected with the link members 69 to impart corresponding swinging movements to the latter. As shown in Figs. 17 and 18 the side arm 110ª at the side of the implement seen in these said figures is provided with a plurality of projections 111 and 113 respectively. The projection 111 has its upper end connected by a link 112 to the driven member of the clutch and the projection 113 has its upper end pivoted directly to the rear end of the link member 69, at 69'. It will be understood that the bail arm 110ª at the other side of the tractor is provided with projections corresponding to the projections 111 and 113, and that the projection 111 has connection, through appropriate means, with the driven member of the clutch and the projection 113 is pivoted to the rear link member 69 at the corresponding side of the implement. In this embodiment of the invention a pedal 114, arranged to be within convenient reach of the operator on the seat of the tractor is moved by said operator to initiate the operation of clutching the driven member 109 to the driving member 109'. The clutch and its operating means, together with its connection to the bail is shown and described in an application for Letters Patent of the United States executed by me of even date herewith and entitled "Farm tractors," now Patent Number 2,051,896, issued Aug. 25, 1936. It is preferred, as shown in the said application, that there be only one of the clutch mechanisms employed and that said mechanism be suitably connected with the bail arm at the side of the tractor opposite the clutch member as well as with the bail arm on the side of the tractor upon which the clutch is located.

It will be understood, therefore, that when the parts of the planting attachments are in working position the clutch will be in the position shown in Fig. 18. Hence, when the raising of the planting attachments to transport position is initiated, by pressure upon the pedal 114, the clutch will make one-half of a complete revolution. In this movement the outer ends of the arms 110ª of the bail will be swung in clockwise direction and will transmit corresponding swinging movement to the rear ends of the link-members 69, thereby swinging the fast crank arms 51 of both half or side sections B of the implement rearward a corresponding distance. This movement of the fast crank arms imparts rotative movement to both rock shafts 50 and to the lifting arms 55 carried by the sleeves 52 which are fast to said rock shafts. The referred to swinging movement of the crank arms 51 also imparts sliding movement to the slides composed of the members 59 and 60, through the arms 65 attached to the members 60, and since said arms 65 are connected to the loose sleeves 54 carrying the lifting arms 56, it will be evident that all of the lifting arms of both side or half sections B are raised simultaneously. The upward swinging movement thus given the outer ends of the lifting arms 55 and 56 is transmitted to the lifting rods 75 through the medium of the stop collars 107 which are engaged with the upper surfaces of said rods, and by this movement of the rods the planting attachments are raised to their referred to transport positions.

When it is desired to lower the planting attachments for operation, the pedal 114 is again pressed, thereby initiating movement of the clutch throughout the remaining one-half of a complete revolution, during which the parts referred to operate in directions the reverse of those set forth in connection with the raising operation—except that the lifting rods are forced downward by corresponding downward movement of the trunnion rings with the respective lifting arms, this movement being transmitted to said lifting rods from said trunnion through the springs 108 and collars 106.

Movement of the planting attachments from working to transport position and from transport to working position, resulting from the operation of the power lift mechanism, are about the projections 27' and 27" of the arch-shaped members 27 as the axes of such movement. In these movements the frame of the planting attachments, the draft yokes, clamps 29 and sleeves 28 move as a unit about said projections 27', 27" and the sweep beams 93 and their links 95 swing accordingly. The movements of the planting attachments, however, in the operation thereof resulting from unevenness in the soil, are about the rear (closed) ends, 96ª, of the draft yokes as the axes of such movement. It will be understood that any tendency to upward movement of the planting attachment resulting from a hump or the like will tend to increase the tension of the springs 108 and that the latter are operative at all times to press the frame and the press wheel of the frame downward to thereby cause the planting attachments to perform their functions effectively.

When the planting attachments are operatively related to the frame of the implement and it is desired to employ the cultivating attachments, the reach rods 102 are removed and the connections between the arms 65 and the loose crank arms 53 are broken by removing the members 174; the sweep beams 93 are disconnected from the links 95 and the side arms 96, 96' of the draft yokes are disconnected from the lugs 29ª by removing the projections 97, 97' at the forward ends of said side arms from the holes 29ᵇ in said lugs. The lower end of each lever 57 is now connected with the corresponding loose crank shaft 53 by a link 74 (see Fig. 22) whose rear end is connected to the levers 57 by a pivot pin 74' which may extend through any one of a series of openings 74" provided in said lever below the fulcrum of the latter. It will be understood that when the cultivating attachments are to be employed, in lieu of the planting attachments, the links 74 provide substitutes for the members 174.

For the use of the cultivating attachments a "hobbling means", shown in Figs. 1, 5, 13, 14, 21 and 23 and now to be described, is mounted upon each half section or side B of the implement frame and is employed to hold the several cultivating attachments applied to respective sections of the main frame against relative lateral movement. Each of these hobbling means comprises a transverse shaft 116 upon which is rotatively mounted a series of sleeves 117, there being one sleeve for each cultivating attachment. The portion of each sleeve 117 surrounding the shaft 116 is bifurcated to provide a space between its sides, and in this space is mounted, upon the shaft, a spacing ring 118, having a set screw 118', or other appropriate element, for fastening it to the shaft. It will thus be seen that these sleeves may be relatively adjusted longitudinally of the shaft and fixed against accidental movement from the positions to which they have been respectively adjusted. This adjustment permits the several cultivating attachments to be spaced the distance from each other which is best adapted to the particular rows to be cultivated. Each sleeve is formed with a downwardly and rearwardly inclined socket 117a to receive the upper end of a removable "hobble" bar 119 which serves as a connection between the sleeve and the corresponding cultivating attachment. These "hobble" bars, when the cultivating attachments are in use, are secured in the corresponding sockets 117a, by pins 117b, or other appropriate fastening elements adapted to permit the arms to be detached from the respective sockets.

In the complete machine there are eight cultivating attachments arranged in pairs, two of said attachments being employed for cultivating opposite sides of each row. These cultivating attachments are of similar construction and hence a description of one will answer for each of the others. Each comprises an appropriate beam 120 or 120a provided with a gang or set of ground-working elements which may be in the form of shovels 121 (Fig. 21), discs 121a (Fig. 22), sweeps 121b (Fig. 23) or combinations thereof as suggested in Fig. 24. Each ground-working element of the respective gangs or sets thereof is adjustably mounted along the length of the corresponding beam 120 or 120a by any suitable means. The means (120) arranged at the outer sides of the machine are arched to provide spaces into which the wheels b may turn in the turning of the machine. (See Fig. 21.) The remaining beams (120a) may be straight, since they are remote from said wheels b. The illustrated means for attaching each ground-working element to its beam includes an appropriate clamp 122 having loops 122a. These loops receive the shanks 123 to which are attached the shovels 121 (Fig. 21), or the corresponding shanks 123a or 123b of the discs (Fig. 22) or sweeps (Fig. 23). The beams 120, 120a are provided at their forward ends with downward projections 124 to extend, respectively, into the openings 29b in the lugs 29a of the corresponding clamps 29, in the same manner in which said lugs were engaged by the similar projections 97, 97' of the draft yokes of the planting attachments, when the latter were in use. Each beam is also provided at an appropriate point with a keeper, such as a clamp 125 provided with the eye or loop 125a, for the lower end of the corresponding rod 119, and also with a means, such as a clamp 126 provided with an eye or loop 126a, to receive the lower end of the corresponding lifting rod 75.

In assembling the cultivating attachments with the frame of the implement, springs 127 are applied, each having its lower end connected to the corresponding crank arm 28a and its upper end connected, by a connector 127a whose upper end is hooked over an appropriate member of the frame of the implement, (as the angle iron 25, for example) from which it may be quickly detached. It will be recalled that the crank arms 28a project from the respective sleeves 28 and are rigid therewith. Thus, each beam will be yieldably supported at its front end by the corresponding spring 127 when its said front end is inserted in the opening in the corresponding lug 29a, since said lug and the corresponding crank 28a are connected into a unitary structure by the corresponding sleeve 28 and clamp 29, and since said sleeve and clamp, with said lug and crank, are rotative about the lateral projection 27' or 27'' of the corresponding arch-shaped member 27. The lifting rods 75 are then connected to the clamps 126 of corresponding beams and the several "hobble" arms are arranged in operative relationship with the sockets 117a and eyes or loops 125a of the clamps 125. Each lifting rod 75 is provided with a spring 128, which is additional to its spring 108. These additional springs, 128, are mounted above the respective trunnion rings 78, with their lower surfaces preferably in contact with the upper surfaces of said rings. The stops or nuts 107, employed with the planting attachments are removed and said nuts, or like nuts or stops, (marked 128a) are mounted on the upper ends of the respective rods to provide abutments for the upper ends of the springs 128. These nuts or stops are adjustable along the lengths of the respective lifting rods to correspondingly vary the tension of the said springs. The springs 108, employed with the planting attachments, are retained and all the other connections which were employed in the case of the planting attachments are unchanged.

In the operation of these cultivating attachments the springs 127 and 128 cooperate to counterbalance the weight of the cultivator beams and their ground-working elements and overcome any tendency of said elements to dig into the ground to a depth greater than that for which they have been set; while the springs 128 act to hold the cultivating elements at their prescribed depth in the event that said elements strike a hard piece of ground. It will thus be noted that a floating action is imparted to these attachments, which is very desirable in cultivating implements.

The depth of penetration of the soil-working elements is regulated as follows: Adjustment of the lever 58 of either half or side section B of the implement, while said lever is latched to its segment 72, moves the outer link-member 68 connected to said lever correspondingly and imparts movement to the fast crank arm 51 to which said link-member is connected. This movement is transmitted through the rock shaft 50 to the side arms 55 of the lifting yoke fixed on the outer end of said shaft, and is also transmitted to the side arms 56 of the lifting yoke loose on said rock shaft through the corresponding slide arm 65, slide composed of the connected side members 59 and 60, lever 57, link 115 and loose crank arm 53. By thus operating either lever 58 all of the lifting rods 75 mounted upon the corresponding half section or side B of the frame of the implement are correspondingly moved with their springs 108 and 128. If adjustment of the depth of penetration of the planting attachments which cultivate either of the outer rows relatively to those which cultivate either of the inner rows, is desired, such adjustment may be effected by movement of the corresponding levers 57 since these levers are capable of movement about their respective fulcrums, independently of the levers 58, and when thus moved operate through the links 74 to move the arms 56 of the loose lifting yoke correspondingly.

The raising of the cultivating attachments from working to transport position and the lowering of the same from transport to working position is accomplished by the power lift mechanism in the same manner in which said mechanism operates in raising and lowering the planting attachments from and into working position: except that lifting movement is transmitted from the arms of the lifting yokes to the corresponding lifting rods 75, through the trunnion rings, 78, springs 128 and nuts 128$^a$. Lowering movement is transmitted from said arms of the lifting yokes to said lifting rods through said trunnion rings, the springs 108 and collars or stops 107 as in the planting attachment. It will be understood that these movements, transmitted to the lifting rods, are imparted thereby to the several cultivating attachments and that the latter are thus correspondingly raised or lowered, pivotally, turning about the lateral projections 27', 27'' as the axes of their movements.

When the implement is provided with the cultivating attachments and it is desired to employ the stalk cutting attachments as substitutes for the cultivating attachment, it will be necessary only to remove the hobble bars 119 and then detach the cultivating attachments from the lugs 29$^b$, thereby freeing the attachments, which can then be removed. The upper springs 128 should also be removed and the stop collars 107 (or 128$^a$) should be replaced in the position adjacent the respective trunnion rings 78 which they occupied when the planting attachments were operatively mounted upon the implement frame. In short, the links 74 which connect the levers 57 with the loose crank arms 53 and the springs 127, which connect the crank 28$^a$ with the frame of the implement are employed when the stalk cutting attachments are operatively connected to said frame as well as when the cultivating attachments are arranged for use in operative relationship with the frame.

There are four of these stalk cutting attachments provided for the complete machine, two of the same being provided for each half section or side B of the frame. Each stalk cutting attachment (see Figs. 26, 27 and 28) includes a series of stalk cutting blades 129 which are respectively mounted on the outer ends of carrying arms 130 which radiate from a hub 131 and are of wide and strong construction, as shown in Fig. 28, to give adequate support to the cutting blades which are secured thereto in any suitable way. The hub 131 is loosely mounted on a transverse shaft whose ends are mounted in bearings 133 each of which is carried by a pair of frame elements 134 and 135 which extend divergently outward from the bearing. Each bearing is secured at its upper end by bolts 134' and 135', to the lower ends of the corresponding arms 134 and 135, respectively. It will be understood that rotation of each hub with its blade-supporting arms 130 is brought about in the forward movement of the attachment by tractive engagement of said blades with the land and that in this rotation the blades are successively brought into engagement with the land and with the stalks to be severed.

The forward ends of the frame elements 135 at opposite sides of the attachments are connected with each other by a transverse member 136, which is preferably integral with said forward ends, and the upper ends of the members 134 and 135 at each side of the attachment are connected with each other by an arcuate member 137, preferably angular in cross section. An arcuate shield 138 is carried by the members 137 and is provided with a transverse angle member 139 which forms a keeper through or by which the lower ends of two corresponding lifting rods 75, 76 are connected to the stalk cutter. The rear, closed, end 140$^a$ of a yoke-shaped draft member comprising side arms 140 extending forwardly from said end is mounted on and suitably secured to a bracket 141 fastened to the member 136 of the attachment frame. The forward ends of the side arms 140 of each yoke are provided with downward projections 142 respectively adapted to enter the openings 29$^b$ in the corresponding lugs 29$^a$.

It will be understood that when these cultivating and stalk cutting attachments are in full operative relationship with the frame of the implement and with the tractor, the rear ends of the link-members 68 will be connected with the power lift mechanism in the manner explained in connection with the planting attachments, and hence that the cultivating and stalk cutting attachments are adapted to be raised and lowered from and into working position by said power lift mechanism, in the same manner in which the power lift mechanism operates to raise and lower the planting attachments.

It will also be understood that when the stalk cutting attachments are connected to the lifting levers 75, they are forced downward, and are raised, by said levers, in the same manner in which the cultivating attachments are forced downward and raised, except that lifting movement is transmitted to said rods through the nuts 107, it being remembered that the upper springs are removed when the stalk cutters are in operative relationship with the implement frame. When said rods have been lowered the cutting elements of the stalk cutters are correspondingly lowered and are held under pressure of the springs 108, whereby they are caused to rotate in the forward movement of the implement by engagement with the land, regardless of irregularities in the contour of the land, and are restrained against any rebounding tendency when they come into contact with hard spots, or with stalks to be severed thereby.

Having thus described the invention what I believe to be new and desire to secure by Letters Patent, is:—

1. A tractor propelled implement comprising a frame provided at its outer side with a ground-engaging wheel, said frame including a transverse member at its forward end having means for pivotally connecting it to the forward end of the tractor to have movement about a horizontal axis relatively to the tractor, a longitudinal member at its inner side, and a diagonal member which connects the outer end of the transverse member with the longitudinal member near the rear end of the latter, said diagonal member having a rearwardly bent rear end and said longitudinal member having its forward end connected to said transverse member and its rear end in vertical alinement with the rearwardly bent rear end portion of the diagonal member and secured to and projecting rearwardly beyond the latter and adapted to loosely enter a socket on the tractor and to receive the propelling thrust from said tractor.

2. A tractor propelled implement comprising a pair of frame sections which are spaced from each other to receive a tractor between them, each of said frame sections having a ground-engaging supporting wheel at its outer side and a transverse member at its forward end, said transverse members having their inner ends connected to have pivotal movement relatively to each other about a common horizontal axis.

3. A tractor propelled implement comprising a pair of frame sections which are spaced from each other to receive a tractor between them, each of said frame sections having a ground-engaging supporting wheel at its outer side and each including a rearwardly extending member arranged at its inner side and adapted to loosely enter a socket on the tractor and to receive the propelling thrust from said tractor, said frame sections having transverse members at their forward ends pivotally connected to have movement relatively to each other about a common horizontal axis.

4. A tractor propelled implement comprising a pair of frame sections which are spaced from each other to receive a tractor between them, each of said frame sections having a ground-engaging supporting wheel at its outer side and including connecting means by which either may be independently moved pivotally about a common horizontal axis relatively to the other and each provided with devices for the interchangeable connection thereto of attachment frames respectively provided with means for performing different tillage operations, and also with devices for tensioning said frames and for variably regulating the depth at which the same shall operate.

5. A tractor propelled implement comprising a pair of frame sections, each including a propelling member having tractor connecting means on its rearward portion and also including a cross member having pivotal tractor connecting means at its inner end and a supporting wheel at its outer end, means for connecting tillage attachments to the frame sections and a connection to at will cause coactive support between the cross members of the two frame sections to give mutual support to the two frame sections when the tractor is withdrawn.

6. A tillage implement comprising a frame having ground-engaging wheels and composed of spaced side sections pivotally connected with each other at the front end of the frame to have relative movement about a horizontal axis and provided with means for connecting said sections to a tractor arranged in the space between the same.

7. A tillage implement comprising a frame having supporting wheels and composed of spaced side sections arranged to receive a tractor between them, said sections having transverse members arranged at the front ends thereof and connected with each other to have relative movement about a horizontal axis, means for connecting said frame detachably to the tractor, and means adjustable relatively to said transverse members to hold the same against relative movement when the frame is detached from the tractor and to free said members for relative movement when the frame is connected to the tractor.

8. A tillage implement according to claim 7 in which the side sections of the frame are provided with props which are movable into and out of ground-engaging position and when in ground-engaging position cooperate with said ground-engaging wheels in supporting the frame when the latter is detached from the tractor.

9. A tillage implement comprising a frame having supporting wheels and composed of spaced side sections arranged to receive a tractor between them, said sections being pivotally connected with each other to have relative movement about a horizontal axis, and means adjustably related to said sections and operative to hold the same against relative movement and to free the same for relative movement, at will.

10. A tillage implement according to claim 9 in which the means to hold the sections against relative movement and to free the same for relative movement includes a bridging member having devices at its opposite ends adjustable into and out of engagement with the members of said sections which have pivotal connection with each other.

11. A tillage implement comprising a frame having supporting wheels and composed of spaced side sections arranged to receive a tractor between them, said sections including front transverse members whose inner ends are in an overlapping relationship, a horizontal pivot connecting the overlapping ends of said members to each other, a hanger operatively related to said overlapping ends and pivot, a bridging member mounted on the hanger and spaced from said overlapping ends and means at the ends of the bridging member to engage the respective transverse frame members and operative thereon to hold the spaced side sections against relative movement and to free them for relative movement, at will.

12. A tillage implement according to claim 11 in which the hanger and bridging member are relatively adjustable and the portion of the hanger between the transverse members and the bridging member is adapted to be engaged by a member by which the frame is connected to the front end of the tractor.

13. A tillage implement according to claim 11 in which the bridging member and hanger have screw threaded engagement with each other and the hanger is provided with a holding nut which engages the bridging member and the portion of the hanger between the bridging member and the transverse frame-members is adapted to be engaged by a device which connects the frame to a tractor.

14. A tillage implement comprising a frame having ground-engaging wheels and composed of spaced side sections arranged to receive a tractor between them, said sections having transverse members at the front ends thereof and connected with each other to have relative movement about a horizontal axis, said frame also provided with means for detachably connecting it to the front end of the tractor and with thrust members which are detachably connectible to the tractor rearward of the front end of the latter.

15. A tillage implement comprising a frame having at its forward end a plurality of pivotal means mounted to have movement about a horizontal axis, each of said pivotal means including a member which extends longitudinally of the implement and is provided with a substantially vertical opening to receive a substantially vertical projection at the forward end of a tillage attachment, and an operator-controlled adjusting and tensioning means carried by said frame and connectible to the respective attachments at places rearward of the forward ends of the latter.

16. A tillage implement to be propelled by a tractor, comprising a frame having at its forward end a plurality of sleeves mounted to have movement about a horizontal axis, members connected to said sleeves and movable unitarily therewith, said members extending longitudinally of the implement and provided with substantially vertical openings to receive substantially vertical projections at the forward ends of tillage attachments, said frame also having tractor-controlled adjusting and tensioning means connectible to the attachments and elements by which power lift mechanism may be connected to operate through said adjusting and tensioning means in moving the attachments to and from working position by power derived from the tractor.

17. A tillage implement comprising a frame composed of spaced side sections provided with supporting wheels and having relative up and down movements, said sections provided at their forward ends with sleeves having movement relatively to each other about a horizontal axis, said sleeves having projections unitary therewith and through which the front ends of tillage attachments may be connected to the respective sleeves, said projections extending longitudinally of the implement and having substantially vertical openings to receive substantially vertical projections at the forward ends of the attachments, and lever-controlled setting and tensioning means to which the attachments are connectible at places rearward of their front ends.

18. A tillage implement comprising a frame provided with lifting yokes pivotally mounted thereon, means for swinging said yokes about their axes, lifting rods having their lower ends provided with means for connecting them to tillage attachments, and means for imparting longitudinal movement to the lifting rods from the pivotal movements of said yokes.

19. A tillage implement according to claim 18 in which the lifting rods are provided with tensioning springs and the means for imparting longitudinal movement to the lifting rods include trunnion rings carried by the lifting yokes and through which the rods extend and upper and lower abutments mounted on said rods in operative relationship with said springs and yokes.

20. A tillage implement comprising a frame provided with means for connecting tillage attachments thereto, said means including lifting rods having their lower ends adapted for connection to said attachments, a rock shaft journalled upon the frame, a lifting yoke fixedly connected to the rock shaft, a second lifting yoke loosely mounted on the rock shaft, connections between the arms of the lifting yokes and the lifting rods through which the rods are respectively moved longitudinally by swinging movements of said yokes, a slide, means, including an operating lever fulcrumed on the slide, for connecting one of the yokes with said slide, a second operating lever and operating connections, including the first mentioned means, for connecting the second operating lever with both yokes.

21. A tillage implement according to claim 66, in which the connections between the arms of the lifting yokes and the lifting rods include tensioning springs for said rods, trunnion rings through which the lifting rods respectively extend loosely and abutments mounted above and below said rings.

22. A tillage implement according to claim 65, in which one of the relatively slidable link members extends rearward of the lever fulcrumed thereon and is adapted for connection to a power lift mechanism operative to raise and lower the same.

23. A tillage implement comprising a frame, an operating lever mounted thereon, a rock shaft journalled upon the frame, a plurality of crank arms secured to the rock shaft, means connecting one of the crank arms with the operating lever, and links in position for connection to the forward ends of tillage attachments for controlling the depth of penetration of the implement, said links respectively connected to the other crank arms.

24. A tillage implement comprising a frame, draft means carried by said frame for connecting a tillage attachment thereto and means for adjusting the working position of and for imposing yielding pressure on said attachment: said adjusting means including a rigid non-draft link to be connected to the forward end of the attachment and a bodily movable spring-tensioned member to be connected to the rear end of the attachment, arms having rocking connection with the frame and to one of which the end of the link opposite the attachment is pivoted, a pair of adjusting levers, means connecting one of said levers with the other of said arms and operative connections between the other lever and the bodily movable member by which the tension of the spring is regulated and said member is moved bodily from corresponding movements of the lever.

25. A tillage implement comprising a frame, means, including a rigid non-draft link, supported from the forward end of the frame and adapted to control the position of the forward end of a tillage attachment, a bodily movable member, having a tensioning spring, carried by the frame and adapted to be connected to the rear end of the tillage attachment, an operating lever, means connecting said lever with the link for transmitting rocking movement to the latter, a second operating lever and means connecting the latter with the bodily movable member for adjusting the tension of the spring and for lifting said member under control of said lever.

26. A tillage implement comprising a frame, an operating lever settable into different selected positions, and controlling connections for the forward ends of a plurality of tillage attachments, said connections being carried by the frame and being under control of said lever, and including a rock shaft having a bell-crank lever at one end and an arm at its opposite end, a rigid non-draft link pivoted at one end to one arm of the bell-crank lever, a second rigid non-draft link pivoted at one end to the arm at the end of the rock shaft opposite the bell-crank lever, said links being adapted for connection to the forward ends of the attachments, a reach rod connected at one end to the other arm of the bell-crank lever and at its other end to the operating lever, bodily movable spring-tensioned members for connection with the rear ends of the respective attachments, and means including a second operating lever acting with relation to the bodily movable spring tensioned members for adjusting the working positions of the attachments and imposing yielding pressure thereon.

27. A tillage implement comprising a frame, and means carried by said frame for connecting a plurality of tillage attachments thereto and for adjusting the working position of and imposing yielding pressure on, said attachments: said means including a plurality of rigid non-draft links to be connected to the forward ends of the respective attachments, and a plurality of bodily movable spring-tensioned members to be connected to the rear ends of the respective attachments, a pair of operating levers, connections between one of said levers and the plurality of links, operative by said lever to impart rocking movement to the links, and connections between the other lever and the bodily movable members, operative to adjust the tension imposed on said members by the springs and to lift said members bodily, by corresponding movements of the lever.

28. A tillage implement comprising a frame, a tillage attachment, supporting means for the forward end of the attachment, including a pivoted sleeve having a rearward projection provided with a substantially vertical opening, the forward end of the attachment having a substantially vertical projection extending into said opening, and means carried by said frame for variably regulating the depth at which the attachment shall operate and to imposed yielding pressure thereon; the latter means including a lifting member connected to the attachment rearward of the forward end of the same, a tensioning spring for said member, and lever-controlled means operatively related to the spring and member to adjust the tension of the spring and to lift said member, respectively, in the movements of the controlling lever in reverse directions.

29. In a tillage implement, a wheel supported main frame adapted to be connected to a wheeled tractor, a tillage attachment, separate from the main frame, means for supporting the tillage attachment from the main frame and to which said attachment is detachably connected, said means including a sleeve mounted to have rotative movement about a horizontal axis relatively to said frame, and supporting means for said sleeve, said supporting means being carried by and projecting downward from the forward end of the main frame and said sleeve having a projection which extends longitudinally with respect to the implement and is provided with a substantially vertical opening and the forward end of said attachment having an angularly disposed projection which enters said opening and is removable therefrom, and means under control of the operator of the implement for raising and lowering the rear end of the attachment through an arc coinciding with the axis of the rotative movement of said sleeve.

30. A tractor-propelled tillage implement comprising a wheel supported main frame adapted to be attached to the frame of the tractor and having means for the interchangeable connection therewith of a plurality of tillage attachments respectively adapted for different tillage operations, said means including spring-tensioned rods carried by said frame and engageable with the attachments rearward of the forward ends of the latter, supporting means for the forward ends of the attachment, said supporting means including a rotatably mounted sleeve having a projection which extends longitudinally of the implement and is provided with a substantially vertical opening to be detachably engaged by angularly disposed projections at the forward end of any one of the several attachments, means under control of the operator of the implement and settable into different selected positions and connections between said means and rods for moving said rods longitudinally to thereby raise or lower the rear end of the attachment about an axis coinciding with the axis of said sleeve.

31. A tillage implement comprising a wheel-supported frame composed of spaced side sections, a tractor arranged in the space between said sections and connecting means between the sections and the tractor permitting sidewise tilting movement about a common horizontal axis of the sections, relatively to each other and of the tractor relatively to the sections.

32. A tillage implement comprising an implement frame composed of spaced side sections each adapted to support a plurality of tillage attachments arranged for row crop operation, said side sections provided with ground-engaging castering wheels at the front ends of their outer sides, a tractor arranged in the space between said side sections, and means for connecting said side sections to each other and to the tractor and for permitting movement on horizontal axes of said side sections relatively to each other and of the tractor relatively to said side sections, in the operation of the implement.

33. The combination of a tractor and an implement frame, said tractor including a forward supporting wheel arranged substantially at the transverse center of its forward end and a pair of supporting wheels outwardly spaced from the rearward ends of its sides, and said implement frame comprising a pair of side sections respectively arranged on opposite sides of the tractor and connected to each other at their forward ends to have movement relatively to each other and to the tractor about a horizontal axis, each of said sections having a supporting wheel at its outer side and provided with means to connect to the section a plurality of tillage attachments relatively arranged for simultaneous operation with respect to a plurality of crop rows at the corresponding side of the forward tractor-supporting wheel.

34. The combination of a tractor and an implement frame, said tractor including a forward supporting wheel arranged substantially at the transverse center of its forward end and a pair of supporting wheels outwardly spaced from the rearward ends of its sides, and said implement frame comprising a pair of side sections respectively arranged on opposite sides of the tractor and connected to each other and to the tractor at their forward ends and also to the tractor at their rearward ends and having movement relatively to each other and to the tractor about a horizontal axis, each of said sections having a supporting wheel at its outer side and provided with means to connect to the sections a plurality of tillage attachments relatively arranged for simultaneous operation with respect to a plurality of crop rows at the corresponding side of the forward tractor wheel.

35. A tractor propelled four-row row crop tillage implement, comprising a tractor and an implement frame, said tractor including a forward supporting wheel arranged substantially at the transverse center of its forward end and a pair of rearward supporting wheels outwardly spaced from the rearward ends of its sides, and said implement frame including a pair of side sections respectively arranged on opposite sides of the tractor and connected to each other and to the tractor to have movement relatively to each other and to the tractor about a horizontal axis, each of said side sections having a supporting wheel at its outer side and provided with means to connect thereto a plurality of tillage attachments relatively arranged for simultaneous operation with respect to two crop-rows at each side of the forward tractor-supporting wheel, the forward tractor-supporting wheel being positioned to travel between two inner rows respectively arranged between its sides and the corresponding rearward tractor-supporting wheels and said rearward tractor-supporting wheels being arranged to travel between two outer rows respectively arranged between their outer sides and the implement supporting wheels.

36. The combination of a tractor, and an implement frame provided with ground-engaging wheels and composed of side sections spaced from each other to receive the tractor between them, said side sections having transverse members arranged adjacent the front end of the tractor and pivotally connected with each other to have relative movement about a horizontal axis and said tractor and side sections having elements co-acting to transmit movement from the tractor to the main frame and to permit relative sidewise tilting movement of the tractor and said main frame.

37. A tillage implement comprising a main supporting frame having ground-engaging wheels and composed of spaced side sections pivotally connected with each other adjacent the front end of the frame to have relative movement about a horizontal axis, said frame sections having longitudinal thrust members at their inner longitudinal sides and a projection at their forward ends, a tractor positioned in the space between the frame sections and provided with means to engage said thrust members and also with means to engage said projection.

38. The combination of a tractor, an implement frame provided with ground-engaging wheels and composed of side sections arranged on opposite sides of the tractor, said side sections having transverse members arranged adjacent the front end of the tractor and pivotally connected with each other to have relative movement about a horizontal axis and also having longitudinal thrust members arranged alongside the tractor, and said tractor having its opposite sides provided with sockets which loosely receive the rear ends of said thrust members, and elements respectively connected to the front end of the tractor and to the transverse members of the frame and co-acting with each other and with said sockets and thrust member in transmitting movement from the tractor to said frame.

39. The combination of a tractor, an implement frame provided with ground-engaging wheels and composed of side sections arranged on opposite sides of the tractor, said side sections having transverse members adjacent the front end of the tractor and pivotally connected with each other to have relative movement about a horizontal axis, and said frame provided with an element which extends upward from said transverse members and with longitudinal thrust members arranged alongside the tractor, and said tractor having its opposite sides provided with sockets in which the rear ends of said thrust members are detachably and loosely mounted and its front end provided with a member having a forwardly open end to receive the projection which extends upward from the transverse members of the main frame.

40. A combination according to claim 39, in which the mouths of the sockets are substantially bell-shaped and the opening in the member at its front end which receives the upwardly extending projection from the transverse member of the main frame is of reducing width from its front end, whereby said sockets and opening co-operate in guiding the thrust members and projection into their proper working positions relatively to the tractor.

41. A tillage implement comprising a main supporting frame having ground-engaging wheels and composed of spaced side sections having transversely extending front members, pivotal means connecting adjacent ends of the transverse members, to thereby enable the side sections to have movement relatively to each other about a horizontal axis, an upwardly extending element connected to the pivotal means, a bridging member adjustably mounted on said element and provided with devices adjustable into and out of engagement with said transversely extending members, and a tractor mounted in the space between said side sections of the main frame and having an element at its front end to releasably engage said upwardly extending element at a place in the latter between the transversely extending front members and the bridging member.

42. A tractor, an attachment-supporting frame propelled by said tractor, tillage attachments carried by said frame, means for adjustably regulating the depth at which said attachments shall work and for holding them yieldably in the positions into which they have been set and power lift mechanisms connected to said means and operative to raise and lower the same between working and transport positions under control of the operator of the tractor: said power lift mechanism including an arm pivotally mounted upon the tractor and provided with a pair of spaced projections, one of which has pivotal connection with a member of said means, an operative-controlled clutch mounted on the tractor, and a link connecting said clutch with the other projection from said arm, said clutch operating through said link to swing said arm in clockwise and counterclockwise directions, respectively, by successive partial revolutions of the clutch.

43. A retractor, a tillage attachment, and means for adjustably regulating the depth at which said attachment is to work and for holding it yieldably in the positions in which it has been set and for lowering it to working position and raising it to transport position: said means including a lifting member connected to the attachment, a tensioning spring for the lifting member, a lever for varying the tension of said spring, a second lever for adjusting the working position of the attachment, operative connections, including a longitudinally extensible link, between said levers and lifting means and tensioning spring, a rocking arm to which one member of the extensible link is pivoted, a power-operated clutch and a connection between said rocking arm and a member of the clutch and operative by successful partial revolutions of said member to rock said arm in clockwise and counterclockwise directions, respectively.

44. A tillage implement comprising a frame, a planter having forwardly extending draft arms and a forwardly extending beam arranged between said draft arms, the rear ends of said draft arms being connected to the forward end of the planter, pivotal means by which the forward ends of the draft arms are connected to the frame, a link to which the forward end of the beam is connected, means for moving said link, and means for adjusting the working position of the planter and for imposing yielding pressure thereon.

45. A tillage implement comprising a main frame, a planter having a frame provided at its forward end with a housing pivoted thereto, means for adjusting the housing about its said pivot relatively to the frame of the planter, draft means connected to said housing, connections between the draft means and the implement frame and adjusting and tensioning means carried by the implement frame and connected to the planter frame.

46. A tillage implement comprising a frame, a planter having a forwardly extending beam whose rear end is fixed to the forward end of the frame, a link whose lower end is connected to the forward end of the beam, draft means pivotally connected to the planter and extending forwardly therefrom, pivotal means by which the forward end of the draft means are connected to the frame, operating levers and connections between said levers and the link and planter, said connections including elements by which the working position of the planter is adjusted and a tensioning means for imposing yielding pressure upon the planter.

47. A tillage implement according to claim 46 in which the draft means is a yoke and the planter includes a frame whose forward end is provided with a housing in which the rear, closed, end of the yoke is journalled.

48. A tillage implement comprising a main frame, a planter having a frame provided at its forward end with a housing pivoted thereto, means for adjusting said housing about its said pivot relatively to the frame of the planter, a sweep beam whose rear end is connected to the housing, and a link whose lower end is pivoted to the forward end of the sweep beam.

49. A tillage implement according to claim 48 in which the link is adjustably connected to the operative-controlled means for moving it, whereby an initial setting of the planter is provided for at its connection with the rear end of the sweep beam and also by adjustment of the link relatively to its operating means.

50. A tillage implement, comprising a main frame, a plurality of tillage attachments separate from the main frame and provided with forwardly extending draft elements having angularly disposed projections at their forward ends, means, including said draft elements, for connecting the respective tillage attachments to the main frame, said means also including a plurality of sleeves which are supported to have rotative movement about a horizontal axis and are formed separate from said draft elements, and arms which extend longitudinally of the implement and have substantially vertical openings to receive the projections at the forward ends of the draft elements, said arms being connected to the respective sleeves to move unitarily therewith.

51. A tillage implement comprising a frame provided with means for connecting tillage attachments thereto, said means including lifting rods having their lower ends adapted for connection to said attachments, tensioning springs on said rods, pivotally mounted yoke-shaped lifting members, each comprising a pair of arms whose inner ends are connected with each other by a sleeve and whose outer ends are provided with trunnion rings through which said rods extend loosely, abutments respectively arranged above said members and below said springs, and operator-controlled means, including a rock shaft upon which said sleeves are mounted, for swinging said members.

52. A tillage implement comprising a frame, a plurality of tillage attachments having angularly disposed projections at their forward ends, a substantially yoke-shaped member secured to the forward end of the frame and extending downward therefrom, said member having the free ends of its side arms provided with lateral projections which extend in opposite directions therefrom, hangers having their upper ends secured to the frame and their lower ends provided with bearings through which said lateral projections extend, and means for connecting the tillage attachment to said projections, including members extending longitudinally of the implement and mounted to have rotative movement relatively to said projections and formed with substantially vertical openings to receive said angularly disposed projections at the forward ends of the tillage attachments.

53. A tillage implement comprising a frame, a plurality of tillage attachments having angularly disposed projections at their forward ends, a substantially yoke-shaped member secured to the forward end of the frame and extending downward therefrom, said member having the free ends of its side arms provided with lateral projections which extend in opposite directions therefrom, hangers having their upper ends secured to the frame and their lower ends provided with bearings through which said lateral projections extend, sleeves rotatably mounted on said lateral projections and means forming a tractive connection between the yoke-shaped member and the sleeve through which forward movement of the implement is transmitted to the attachments, said means comprising members respectively fixed to the sleeves and provided with rearwardly extending projections having substantially vertical openings which receive the angularly disposed projections at the forward ends of the tillage attachments.

54. A tractor-propelled tillage implement comprising a frame, a tillage attachment, supporting means by which the forward end of the tillage attachment is detachably connected to the frame, including a rotatably mounted sleeve and a member which extends longitudinally of the implement and is provided with a substantially vertical opening, said tillage attachment having at its forward end an angularly disposed projection which enters said opening, a spring-tensioned lifting member detachably connected to the attachment rearward of the forward end of the latter, depth regulating means connected to said member and a power lift mechanism detachably connected to said depth regulating means and operating through said depth regulating means to raise and lower the attachment from and into ground working position.

55. In a tillage implement, a main frame, downwardly extending row straddling members having their upper ends connected to said frame and their lower ends provided with projections extending laterally in opposite directions therefrom, hangers whose upper ends are secured to said main frame and whose lower ends are connected to the row straddling members, sleeves rotatably mounted on said projections, crank arms projecting from said sleeves, for the connection of removable tensioning springs to said sleeves, and means mounted on said sleeves and connected thereto to move unitarily therewith, said means having lugs formed with substantially vertically arranged openings for the connection of tillage attachments thereto.

56. In a tillage implement, a main frame, a sleeve mounted for movement upon a horizontal axis and provided with a crank arm for connection thereto of a removable tensioning spring, means for supporting said sleeve against vertical movement relative to the main frame, a clamp encircling said sleeve and having a lug formed with a substantially vertical opening for the removable connection thereto of a tillage attachment and means on said sleeve and clamp for fixing them together against relative rotative movement, said clamp serving to provide a tractive connection between the sleeve and the tillage attachment.

57. A tractor-propelled implement comprising a frame provided at its outer side with a ground-engaging wheel, said frame including a forward and a rearward transverse member, both arranged at the forward end of the frame, said rearward member having means for pivotally connecting it to the forward end of the tractor to have movement about a horizontal axis relatively to said tractor and said forward member having means for connecting tillage attachments thereto, the frame also including a longitudinal member arranged at its inner side and having its forward end secured to said forward transverse member and a diagonal member having a forwardly bent forward end secured to the outer end portion of said rearward transverse member and a rearwardly bent rear end arranged in the vertical plane of the rear end portion of the longitudinal member and secured to the latter, said rear end portion of the longitudinal member extending rearwardly beyond the rearwardly bent end of the diagonal member and being adapted to loosely enter a socket on the tractor and to receive the propelling thrust from said tractor.

58. A tillage implement comprising a main frame, tillage attachments, means through which the front ends of the tillage attachments have pivotal connection with the main frame, bodily movable supporting elements connected to the tillage attachments respectively at places rearward of the front ends of the latter, tensioning springs for said elements, a rock shaft, lifting yokes respectively having fast and loose connection with said rock shaft at one of their ends and each comprising a pair of side arms whose free ends are provided with spaced projections, trunnioned nuts mounted between and carried by said spaced projection of the respective arms and through which the said supporting elements respectively extend and means including said shaft, yokes and nuts, for adjusting the tension of said springs and for moving the supporting elements bodily.

59. A tillage implement comprising a frame, lifting devices for connecting tillage attachments to said frame, a rock shaft journalled upon the frame, a lifting arm fixedly connected to the rock shaft, a second lifting arm loosely mounted on the rock shaft, connections between the arms and the lifting devices through which said devices are respectively moved by the arms, and means, including a forwardly and rearwardly moving member and an operating lever fulcrumed upon said member, for turning said shaft with its fixed arm and for turning the loose arm upon the shaft, to thereby impart movement to the lifting arms.

60. A tillage implement comprising a frame, lifting devices for connecting tillage attachments to said frame, a rock shaft journalled upon the frame, a lifting arm fixedly connected to the rock shaft, a second lifting arm loosely mounted on the rock shaft, connections between said arms and the lifting devices, through which said devices are respectively moved by the arms, an operating lever, a slide upon which one of said levers is fulcrumed, said slide having an arm connected to one of the lifting arms, means connecting the lever to the other lifting arm, a second operating lever and means connecting the latter lever to the first mentioned lifting arm.

61. A tillage implement comprising a frame, a rock shaft journalled upon the frame, a first lifting arm, fixedly connected to the rock shaft, a second lifting arm, loosely mounted on said shaft, lifting devices adapted to be connected to tillage attachments, connections between the respective lifting arms and the lifting devices, through which said devices are moved by swinging movements of the arms, respectively, a first operating lever, a second operating lever and operating connections between said first operating lever and the rock shaft and second lifting arm and between the second operating lever and one of said lifting arms only, the operating connections including a link having relatively movable members, one of which has connection with the rock shaft, means for moving said members relatively to each other upon movement of said lever, a slide upon which the second operating lever is fulcrumed and which slide has connection with the rock shaft, a member for connecting the slide to and disconnecting it from the second lifting arm, at will, and a member for connecting the second operating lever to and disconnecting it from the second lifting arm, at will.

62. A tillage implement comprising a frame, a rock shaft journalled upon the frame, a first lifting arm fixedly connected to the rock shaft, a second lifting arm loosely mounted on said shaft, lifting devices adapted to be connected to tillage attachments, connections between the respective lifting arms and the lifting devices and through which said devices are moved by swinging movements of the arms, respectively, a first operating lever, connections between said operating lever and the rock shaft, for rocking the latter, a slide having connection with said rock shaft, a second operating lever journalled upon said slide and means connecting the second operating lever with the second swinging arm.

63. A tillage implement according to claim 62 in which the means for connecting the second operating lever with the second swinging arm is of readily disconnectible nature and a readily disconnectible means is provided for connecting said slide to the second lifting arm.

64. A tillage implement comprising a frame, lifting devices for connecting tillage attachments to said frame, a rock shaft journalled upon the frame, a lifting arm fixedly connected to the rock shaft, a second lifting arm loosely mounted on the rock shaft, connections between the arms and the lifting devices through which said devices are respectively moved by the arms, and means, including a forwardly and rearwardly moving member and an operating lever fulcrumed upon said member, for turning said shaft with its fixed arm and for turning the loose arm upon the shaft, to thereby impart movement to the lifting arms.

65. A tillage implement comprising a frame, a rock shaft journalled upon the frame, a lifting arm fixedly connected to the rock shaft, a second lifting arm loosely mounted on said rock shaft, lifting devices adapted to be connected to tillage attachments, connections between the lifting arms and the lifting devices, through which said devices are respectively moved by swinging movements of the arms, and means for imparting said swinging movements to the lifting arms, said means including an operating lever, a link comprising a pair of slidably connected members to one of which the lever is fulcrumed and a link connecting the said lever to the other of said members.

66. A tillage implement comprising a frame, a rock shaft journalled upon the frame, a lifting yoke, fixedly connected to said rock shaft, a second lifting yoke, loosely mounted on the rock shaft, lifting rods having their lower ends adapted for connection to tillage attachments, connections between the arms of the lifting yokes and the lifting rods and through which the rods are respectively moved longitudinally by swinging movements of said yoke, and means for imparting rocking movement to said lifting yokes, including operating levers, a slide, a link comprising a pair of slidably connected members and a second link having one of its ends connected to one of said link-members, one of said levers being fulcrumed upon the slide and the other fulcrumed upon one of said link members and being pivoted to the other end of the second link.

67. A tillage implement including a wheel-supported implement frame, an attachment frame, a supporting member for the attachment frame, projecting downward from the forward end of the implement frame and having a lateral projection, a sleeve rotatably mounted on said projection, a lug connected to and rotative with said sleeve, means arranged at the forward end of the attachment frame and having a substantially vertically arranged projection, said lug having a substantially vertical opening in which said projection is removably mounted, and means carried by the implement frame and connected to the attachment frame and operative to move the attachment frame and the lug and sleeve about a horizontal axis relative to said lateral projection.

68. A tillage implement including a wheel-supported implement frame and an attachment frame, supporting members for the attachment frame, projecting downward from the forward end of the implement frame and having lateral projections, sleeves respectively mounted rotatably on said projections, lugs connected to and rotative with the respective sleeves, a pair of draft arms common to the attachment frame and projecting forwardly therefrom and having their forward ends provided with angularly disposed projections, said lugs having openings in which said projections are removably mounted, and means carried by the implement frame and connected to the attachment frame and operative to move the attachment frame and the lugs and sleeves about a horizontal axis relative to said lateral projections.

69. A tillage implement according to claim 68 in which the rear ends of the draft arms are connected with each other to thereby form a yoke-shaped draft member.

70. A tillage implement according to claim 68 in which the draft arms are connected with each other for unitary movement and their rear ends are fixedly attached to the forward end of the attachment frame.

71. A tillage implement according to claim 68 in which the rear ends of the draft arms are pivotally connected to the forward end of the attachment frame to have movement upon a horizontal axis relative to the latter.

72. A tillage implement according to claim 68 in which the draft arms are connected with each other to have unitary movement and their rear ends are pivotally connected to the forward end of the attachment frame to have movement upon a horizontal axis relative to the latter.

73. A tillage implement including a wheel-supported implement frame, an attachment frame, a supporting member for the attachment frame, projecting downward from the forward end of the implement frame and having a lateral projection, a sleeve rotatably mounted on said projection, a clamp fixed to said sleeve and provided with a lug having a substantially vertical opening, means arranged at the forward end of the attachment frame and having a substantially vertically disposed projection removably mounted in the opening in said lug, and means carried by the implement frame and connected to the attachment frame and operative to move the attachment frame and the lug and sleeve about a horizontal axis relative to said lateral projection.

74. A tillage implement including a wheel-supported implement frame and an attachment frame, a hanger projecting downward from the forward end of the implement frame and having an eye at its lower end, a member also projecting downward from the forward end of the implement frame and having a lateral projection extending through and beyond the eye of the hanger, a sleeve rotatably mounted on said projection, a lug connected to and rotative with said sleeve, means arranged at the forward end of the attachment frame and having a substantially vertically disposed projection, said lug having a substantially vertical opening in which the latter projection is removably mounted, and means carried by the implement frame and connected to the attachment frame and operative to move the attachment frame and the lug and sleeve about a horizontal axis relative to said lateral projection.

75. A tillage implement including a wheel-supported implement frame, an attachment frame, a hanger projecting downward from the forward end of the implement frame and having an eye at its lower end, a member also projecting downward from the forward end of the implement frame and having a lateral projection extending through and beyond the eye of the hanger, a sleeve rotatably mounted on said projection, a clamp fixed to said sleeve and provided with a lug having a substantially vertical opening, means arranged at the forward end of the attachment frame and having a substantially vertically disposed projection removably mounted in the opening in said lug, and means carried by the implement frame and connected to the attachment frame and operative to move the attachment frame and the lug and sleeve about a horizontal axis relative to said lateral projection.

76. A tillage implement including a wheel-supported implement frame, an attachment frame, a supporting member for the attachment frame, projecting downward from the forward end of the implement frame and having a lateral projection, a sleeve rotatably mounted on said projection and provided with a crank arm releasably engageable by a spring carried by the implement frame, and a clamp fixedly secured to said sleeve and having a lug provided with a substantially vertical opening to receive a substantially vertically disposed projection from a member which extends from the attachment frame and is removably engageable with the sleeve through the medium of its said angularly disposed projection and the lug and clamp.

77. A tillage implement to be propelled by a tractor, comprising a frame having at its forward end a plurality of sleeves mounted to have movement about a horizontal axis and provided with projections for the connection of counterbalancing springs therefor, clamps formed separately from said sleeves and respectively extending around the same, said sleeves and clamps having means coacting to fixedly secure them to each other for unitary rotative movement and each of said clamps being formed with a projection having a substantially vertical opening adapting a tillage attachment to be connected thereto, and means carried by the frame for tensioning and regulating the working position of the tillage attachment and for raising the same from and into their working positions.

78. A tractor-propelled tillage implement comprising a wheel-supported main frame, an attachment frame having a rotative ground-engaging supporting element, depth regulating means carried by the main frame and connected to the attachment frame, said depth regulating means including means for imposing yielding pressure on the attachment frame in the operation of the attachment, means, including said depth regulating means, to raise and lower the attachment frame from and into working position by power derived from the tractor and means connecting the attachment frame to the main frame, comprising a supporting member extending downward from the front end of the main frame and a draft element which extends longitudinally of the implement from the forward end of the attachment frame to said supporting member and whose rear and forward ends are provided with horizontal pivots by which they are connected with the forward end of the attachment frame and said supporting member, respectively, to thereby permit movement of the attachment frame about a horizontal axis relatively to the rear end of the draft element in the depth regulating operation and in response to irregularity in the land engaged by said rotative ground-engaging supporting element and to permit movement of said draft element and the attachment frame unitarily and relatively to the supporting member and main frame about a horizontal axis at the forward end of said draft element, in the raising and lowering of the attachment frame from and into working position.

79. A tillage implement comprising an implement frame, an attachment frame, a draft means intermediate the implement frame and attachment frame and means for adjusting the attachment frame relatively to the implement frame and for imposing yielding pressure on said attachment frame; said implement frame having means extending downward from its front end for supporting the forward end of the draft means and connecting the latter to said forward end of said implement frame, said draft means extending longitudinally of the implement from the forward end of the attachment frame to said means at the front end of the implement frame and having its forward end pivoted to the latter to have movement relatively thereto about a horizontal axis.

80. A tillage implement comprising a frame, a rock shaft journalled upon the frame, a first lifting arm, fixedly connected to the rock shaft, a second lifting arm, loosely mounted on said shaft, lifting devices adapted to be connected to tillage attachments, connections between the respective lifting arms and the lifting devices, through which said devices are moved by swinging movements of the arms, respectively, a first operating lever, a second operating lever, and operating connections between said first operating lever and the rock shaft and second lifting arm and between the second operating lever and one of said lifting arms only, the operating connections between said first operating lever and the rock shaft including a longitudinally extensible link to one member of which said lever is pivoted and a second link connecting said member to the other member of the longitudinally extensible link, and the connection between said lever and the second lifting arm including a slide which has connection with said rock shaft and a link which connects the slide to the first lifting arm.

CHARLES T. RAY.